US012811490B2

(12) United States Patent
Hariya et al.

(10) Patent No.: US 12,811,490 B2
(45) Date of Patent: Nov. 24, 2026

(54) ELECTRIC POWER CONVERSION APPARATUS AND ELECTRIC POWER CONVERSION SYSTEM

(71) Applicant: Astemo, Ltd., Tokyo (JP)

(72) Inventors: Akinori Hariya, Tokyo (JP); Kenta Terada, Tokyo (JP)

(73) Assignee: ASTEMO, LTD., Tokyo (JP)

( * ) Notice: Subject to any disclaimer, the term of this patent is extended or adjusted under 35 U.S.C. 154(b) by 116 days.

(21) Appl. No.: 18/869,116

(22) PCT Filed: Jul. 13, 2022

(86) PCT No.: PCT/JP2022/027581
§ 371 (c)(1),
(2) Date: Nov. 25, 2024

(87) PCT Pub. No.: WO2024/013887
PCT Pub. Date: Jan. 18, 2024

(65) Prior Publication Data
US 2026/0005599 A1 Jan. 1, 2026

(51) Int. Cl.
*H02M 1/32* (2007.01)
*H02M 3/335* (2006.01)

(52) U.S. Cl.
CPC ......... *H02M 1/32* (2013.01); *H02M 3/33576* (2013.01)

(58) Field of Classification Search
CPC ............................ H02M 1/32; H02M 3/33576
See application file for complete search history.

(56) References Cited

U.S. PATENT DOCUMENTS

2007/0025125 A1* 2/2007 Nakahori ................ H02M 1/34 363/56.02
2015/0263631 A1* 9/2015 Matsuura .......... H02M 3/33576 363/21.02
(Continued)

FOREIGN PATENT DOCUMENTS

JP H06-86454 A 3/1994
JP 2005-192324 A 7/2005
(Continued)

OTHER PUBLICATIONS

Oct. 4, 2022 International Search Report issued in International Patent Application No. PCT/JP2022/027581.

*Primary Examiner* — Rafael O De Leon Domenech
(74) *Attorney, Agent, or Firm* — Oliff PLC

(57) ABSTRACT

An electric power conversion apparatus includes: a first electric power terminal including two coupling terminals; a voltage sensor detecting a voltage between the two coupling terminals; a switching circuit coupled to the first electric power terminal; a transformer including a first winding coupled to the switching circuit, and a second winding; a rectifying circuit coupled to the second winding; a smoothing circuit; a second electric power terminal; and a control circuit. The control circuit causes the rectifying circuit to supply electric power from the second electric power terminal toward the first electric power terminal in a second period that precedes a first period during which electric power is supplied from the first electric power terminal toward the second electric power terminal, and detects a short circuit between the two coupling terminals by comparing the voltage detected by the voltage sensor with a predetermined threshold voltage, in the second period.

14 Claims, 28 Drawing Sheets

(56) References Cited

U.S. PATENT DOCUMENTS

| | | | | |
|---|---|---|---|---|
| 2019/0214916 | A1* | 7/2019 | Takahara | H02M 7/53878 |
| 2020/0137862 | A1* | 4/2020 | Kawaguchi | H05G 1/12 |

FOREIGN PATENT DOCUMENTS

| | | | |
|---|---|---|---|
| JP | 4529851 | B2 | 8/2010 |
| JP | 2018-129977 | A | 8/2018 |
| WO | 2022/131121 | A1 | 6/2022 |

* cited by examiner

[ FIG. 3 ]
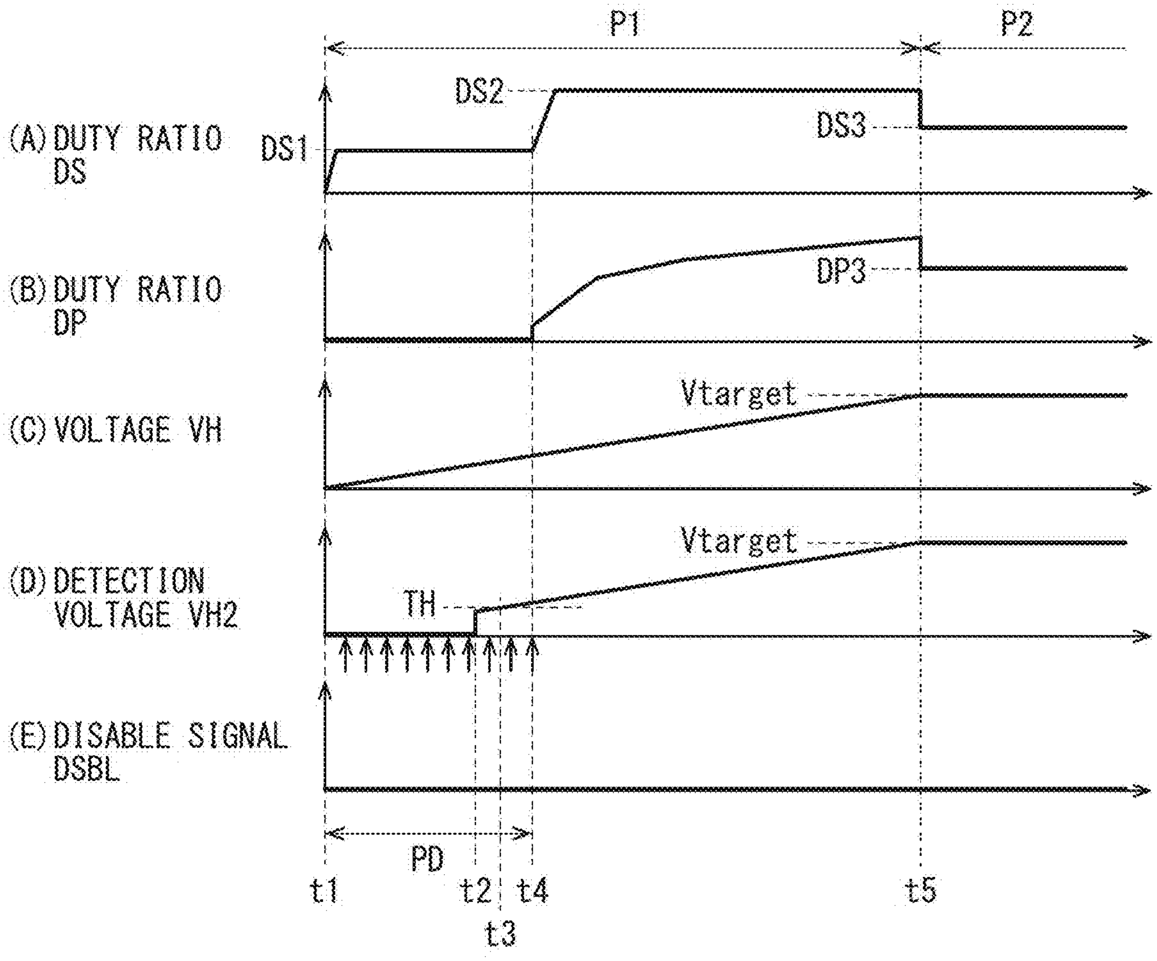

[ FIG. 4 ]
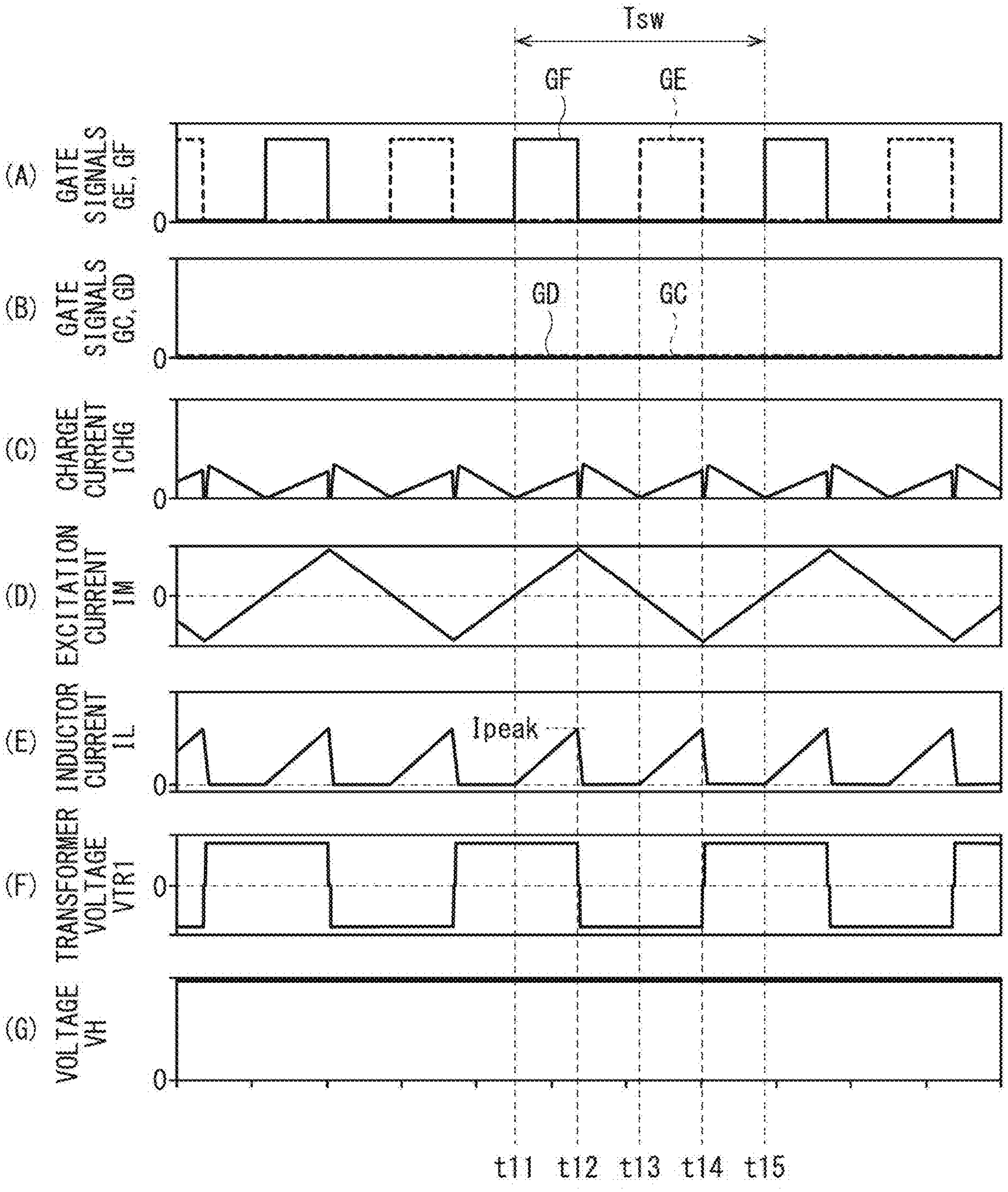

[ FIG. 5 ]
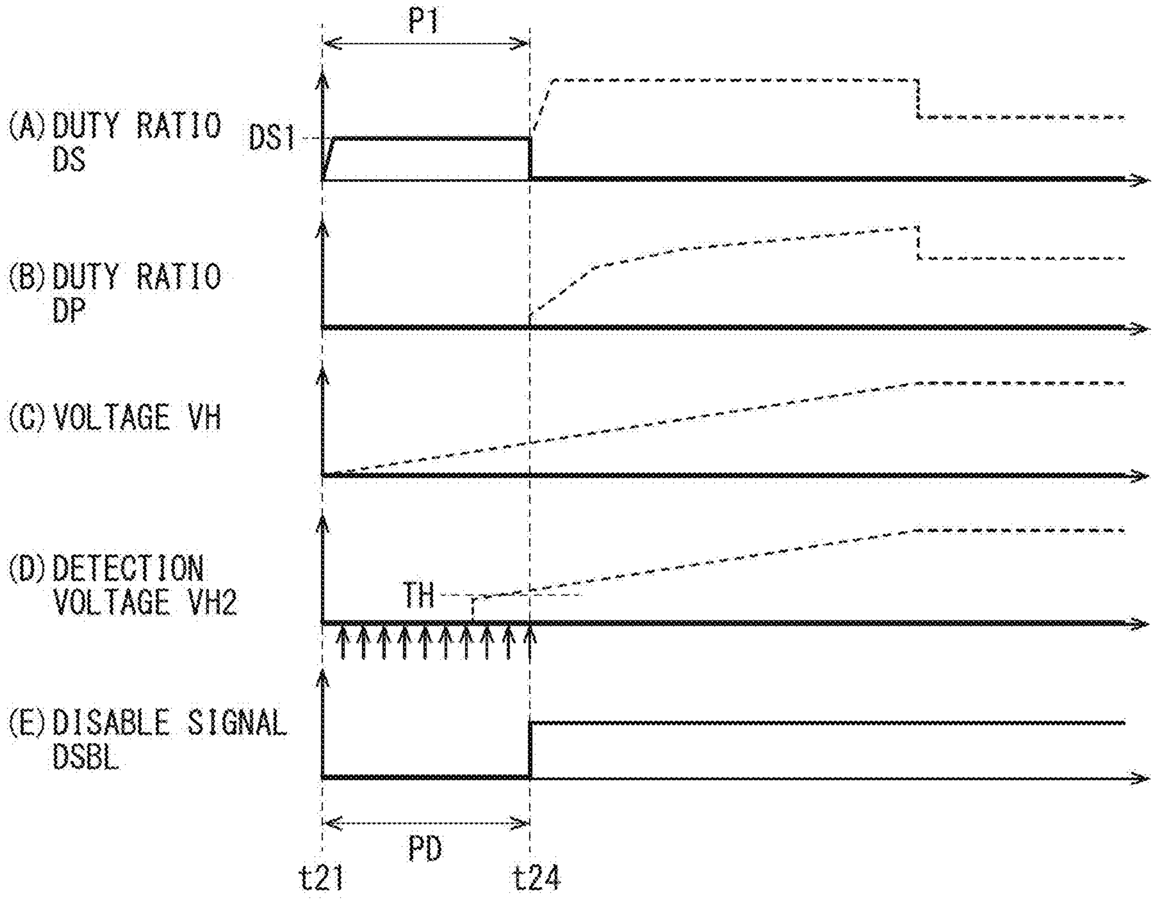

[ FIG. 6 ]
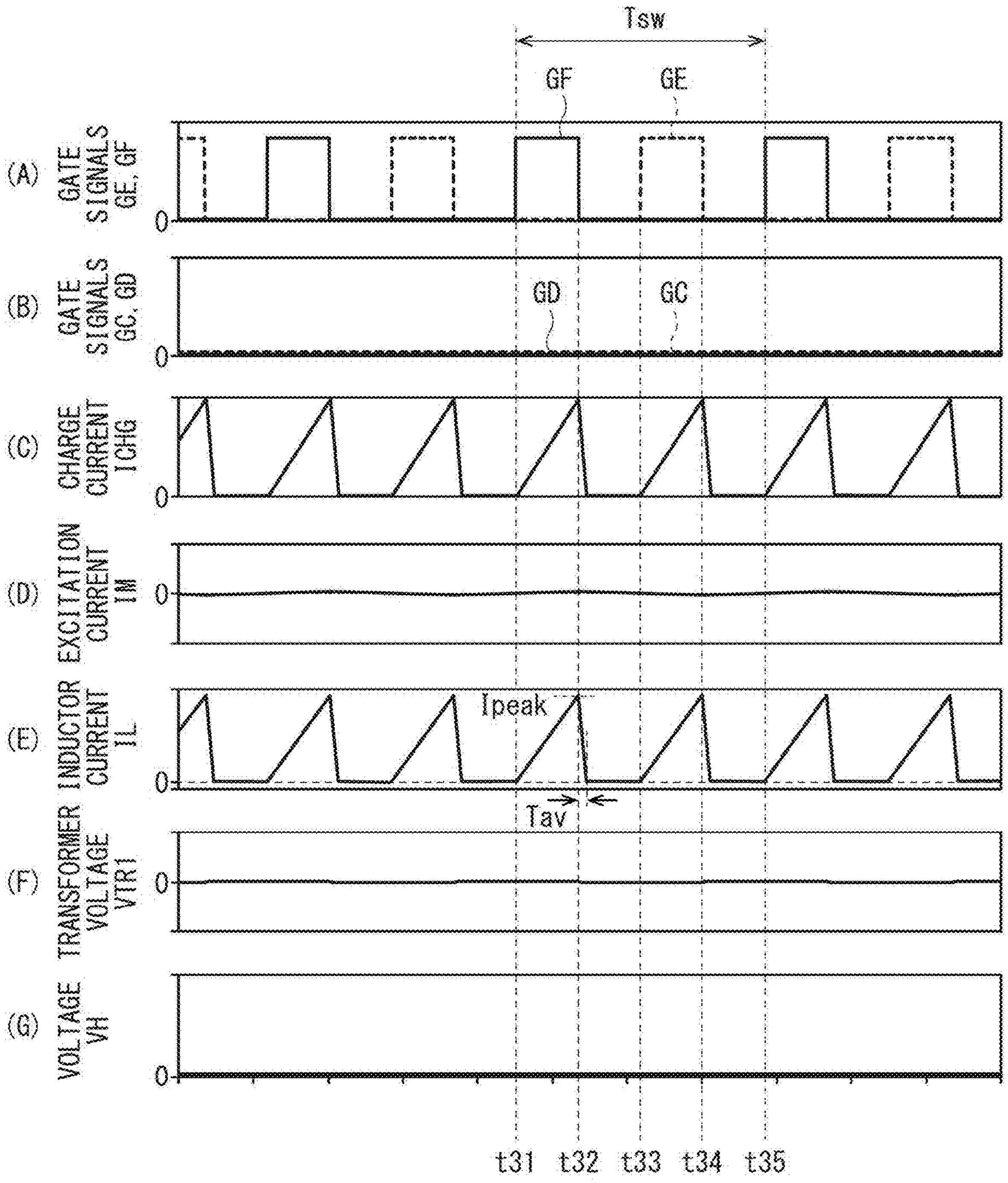

[ FIG. 7A ]
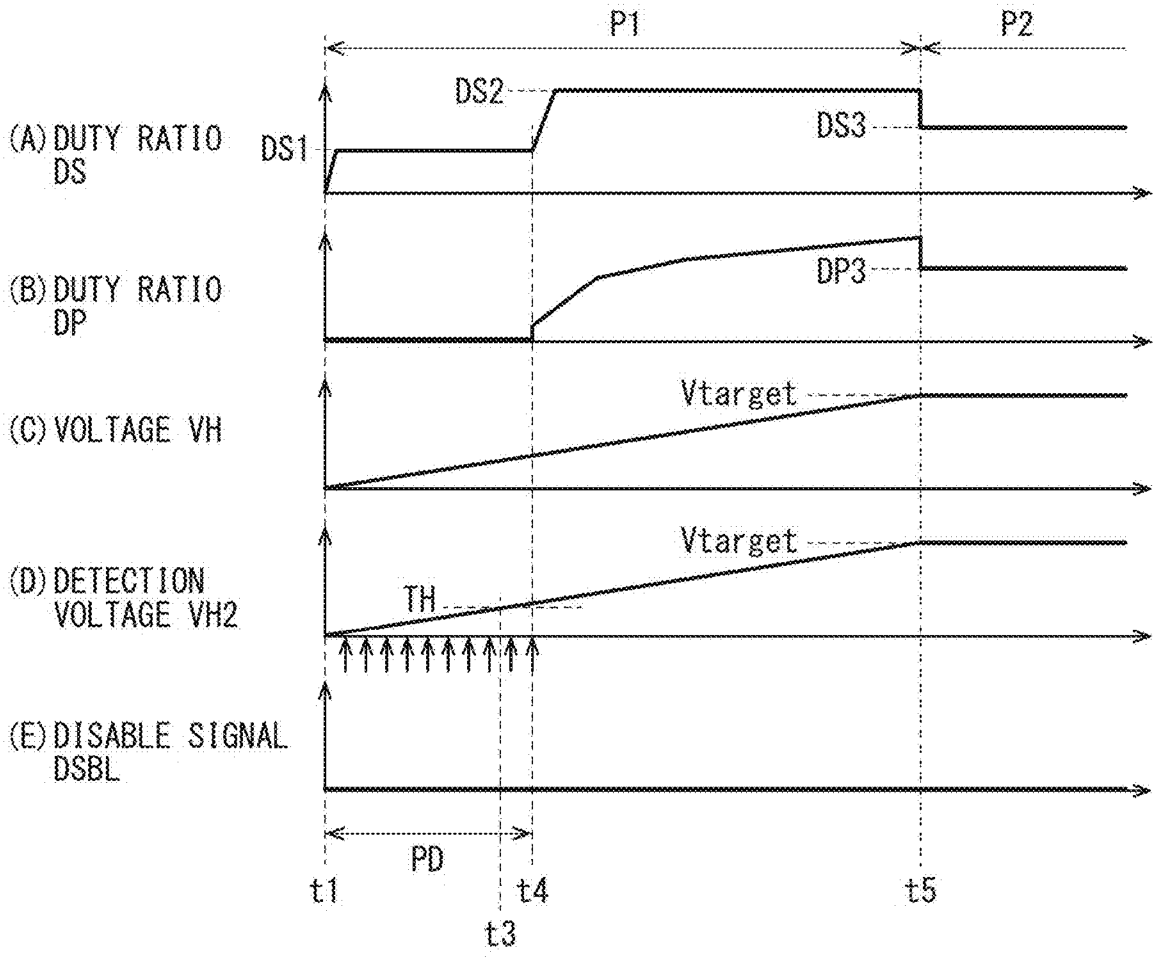

[ FIG. 7B ]
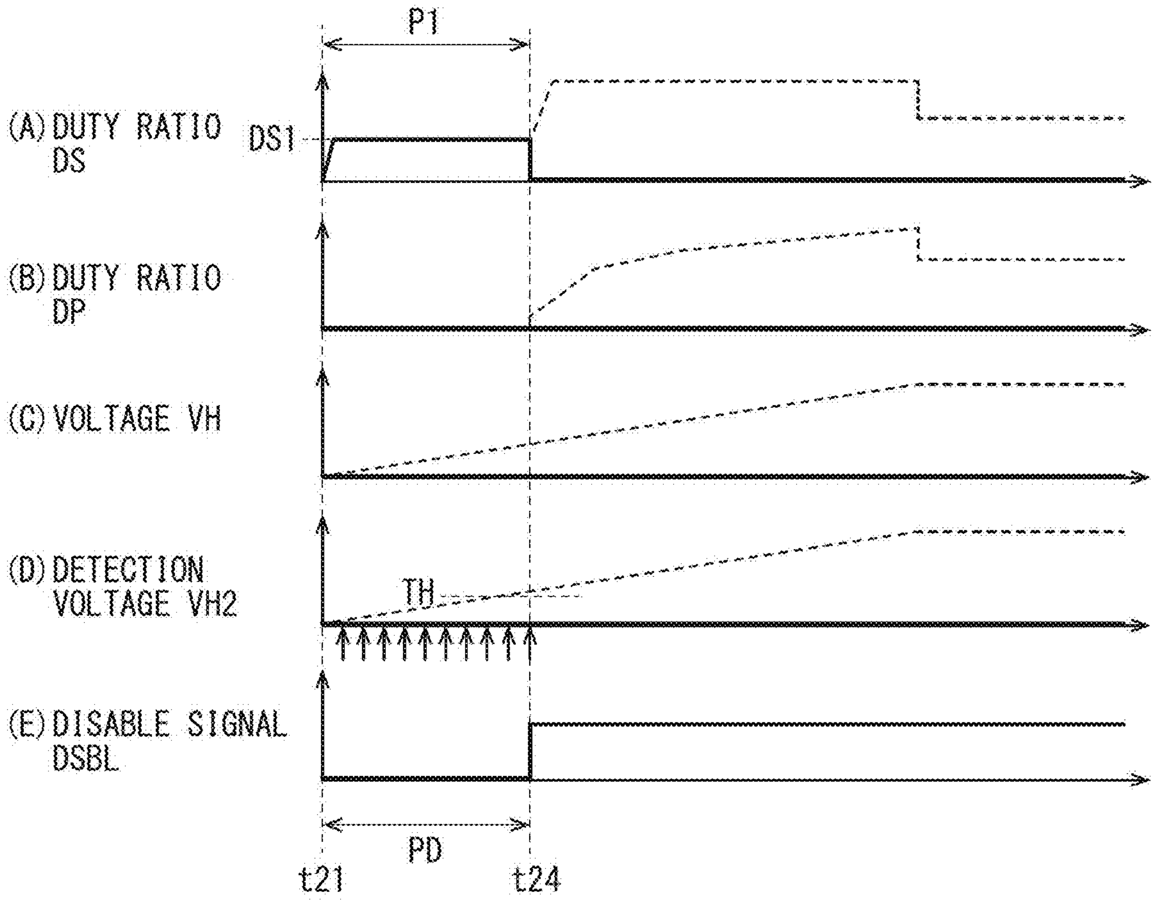

[ FIG. 8A ]
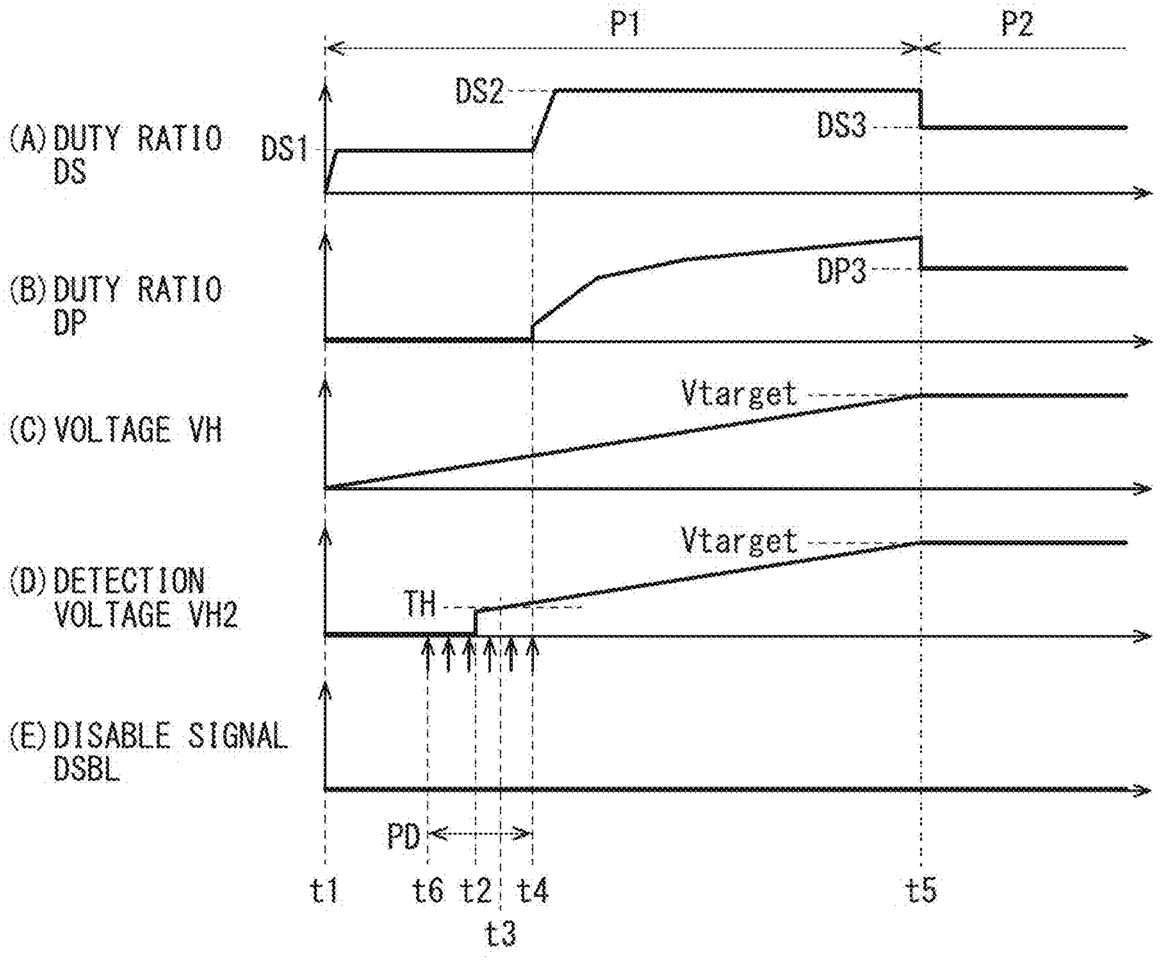

[ FIG. 8B ]
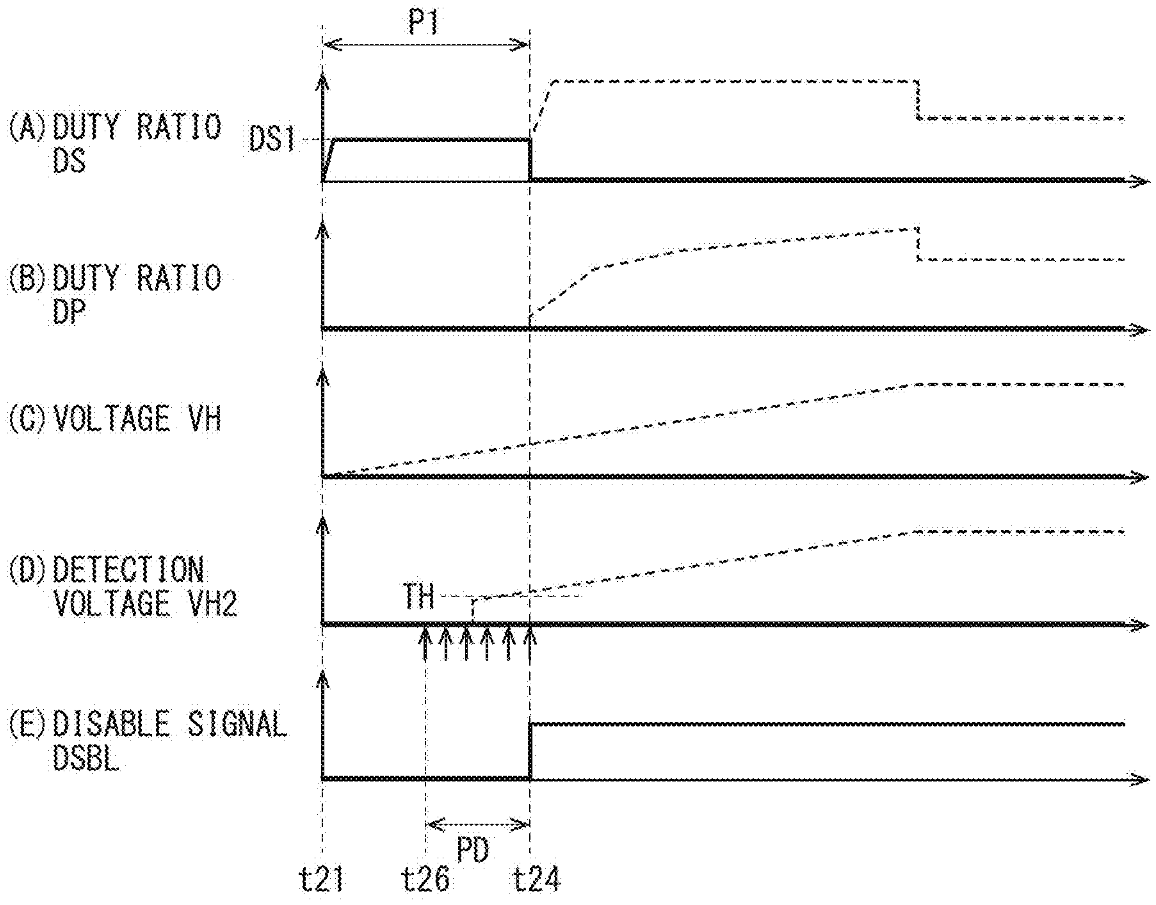

[ FIG. 9 ]
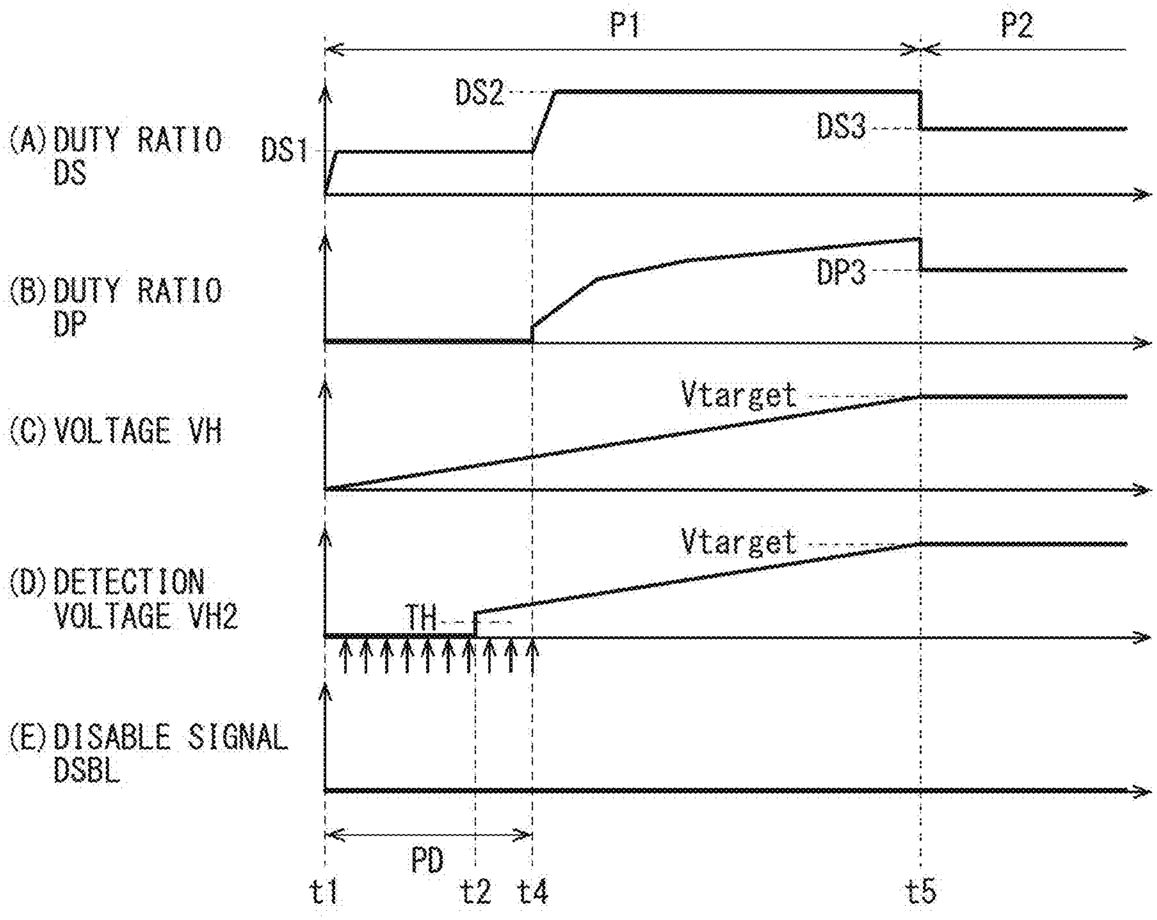

[ FIG. 11 ]

[ FIG. 16A ]
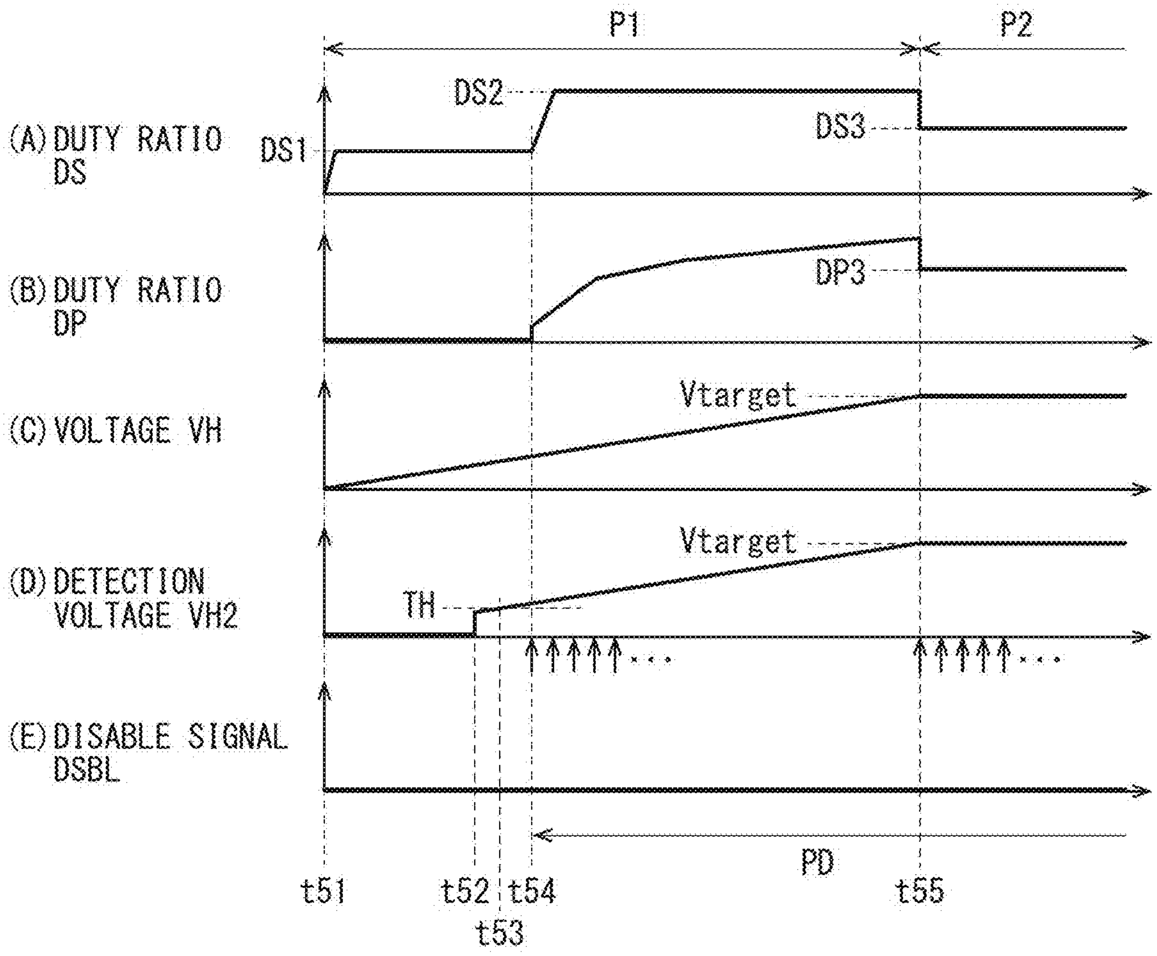

[ FIG. 16B ]
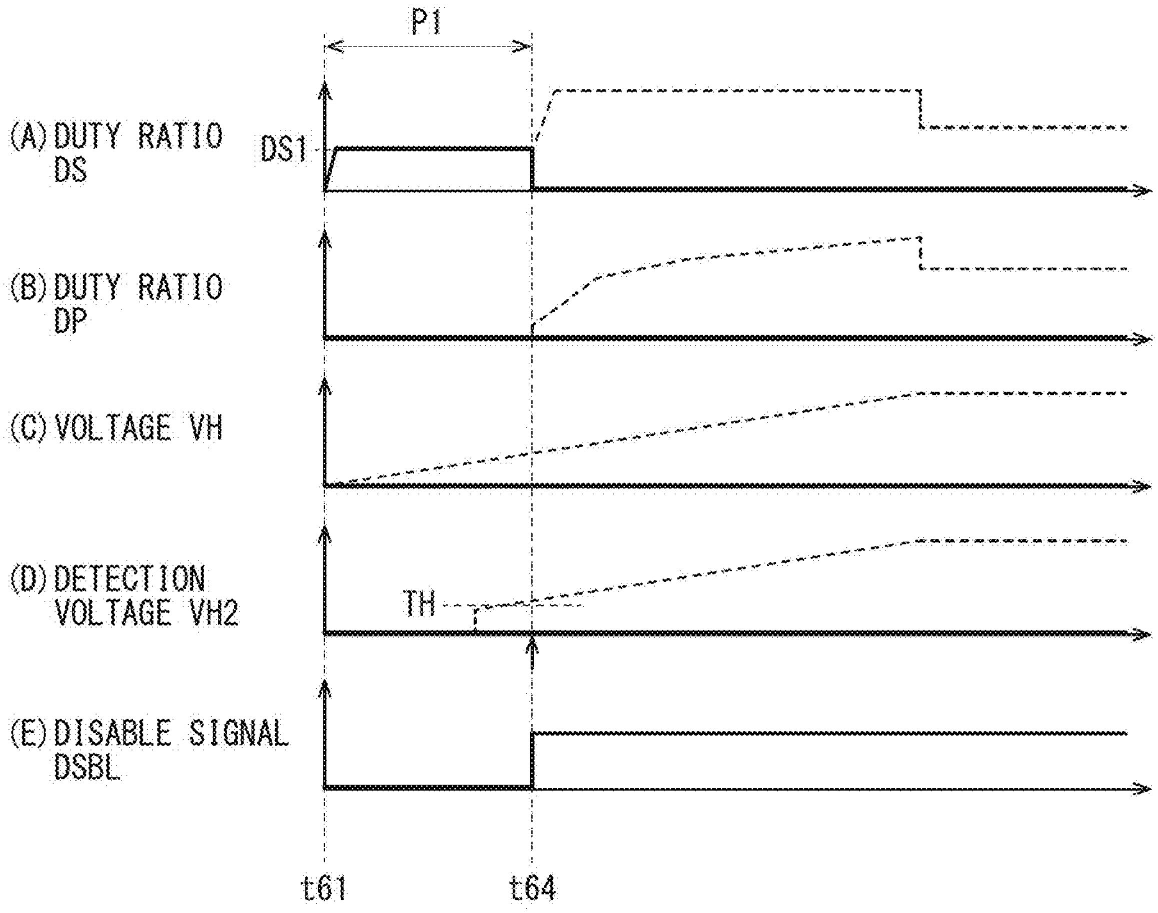

[ FIG. 16C ]
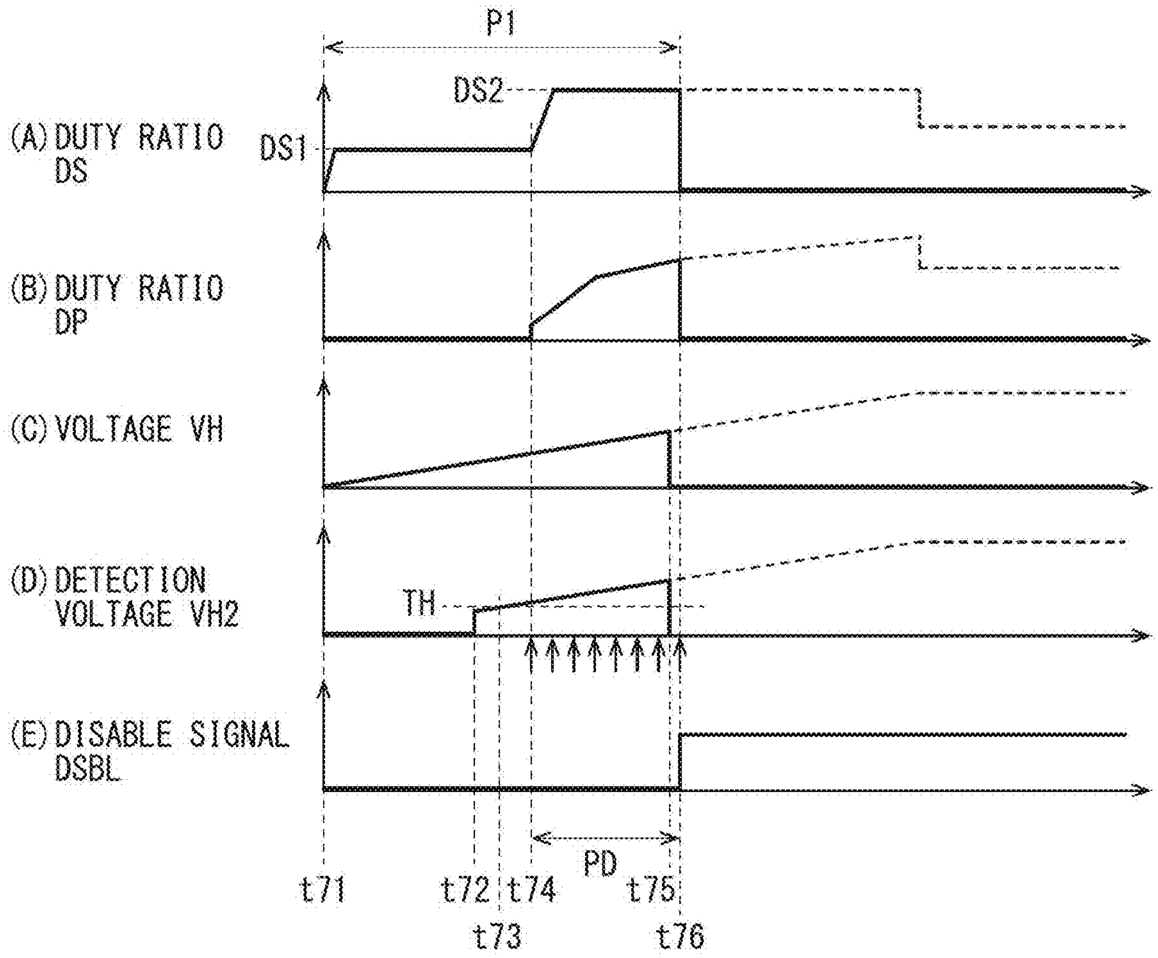

[ FIG. 17A ]
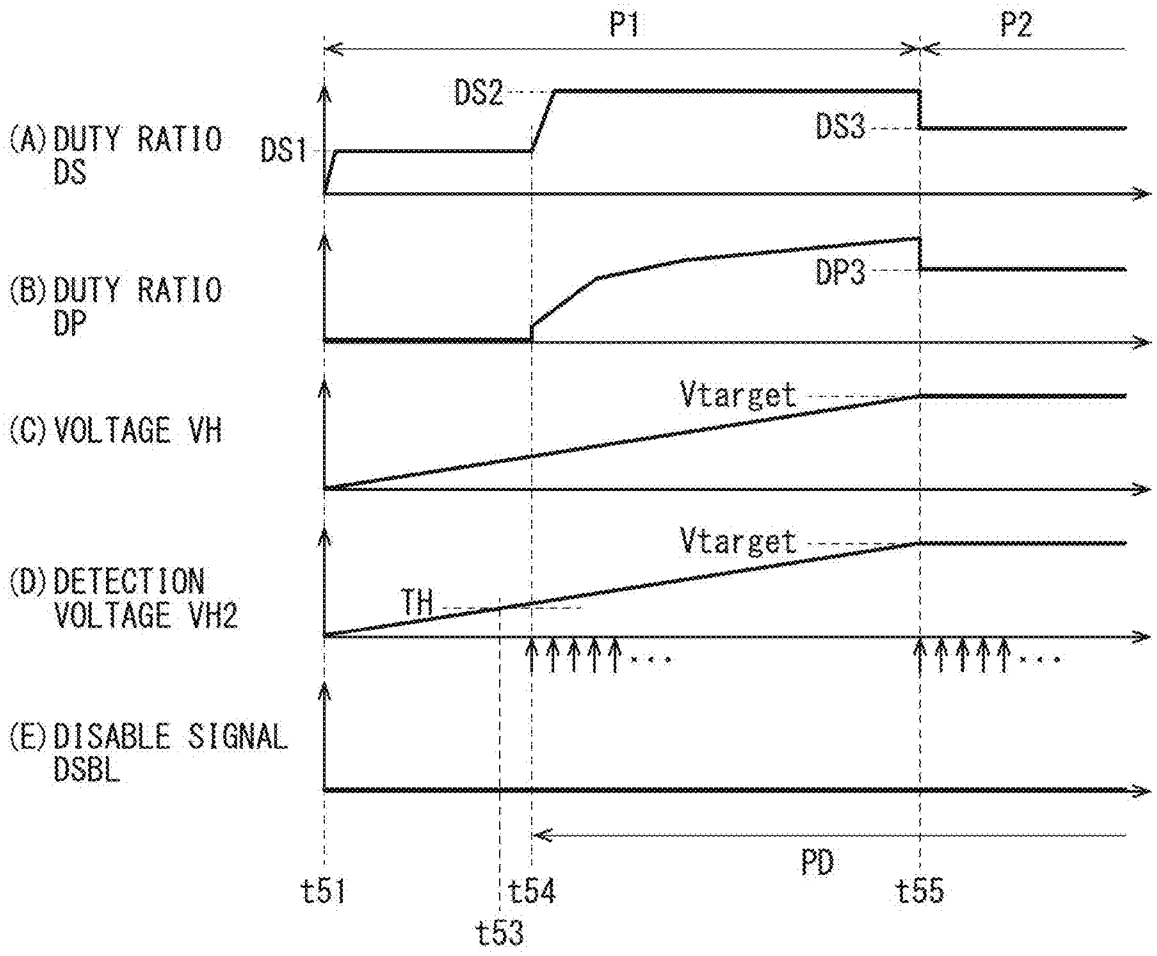

[ FIG. 17B ]
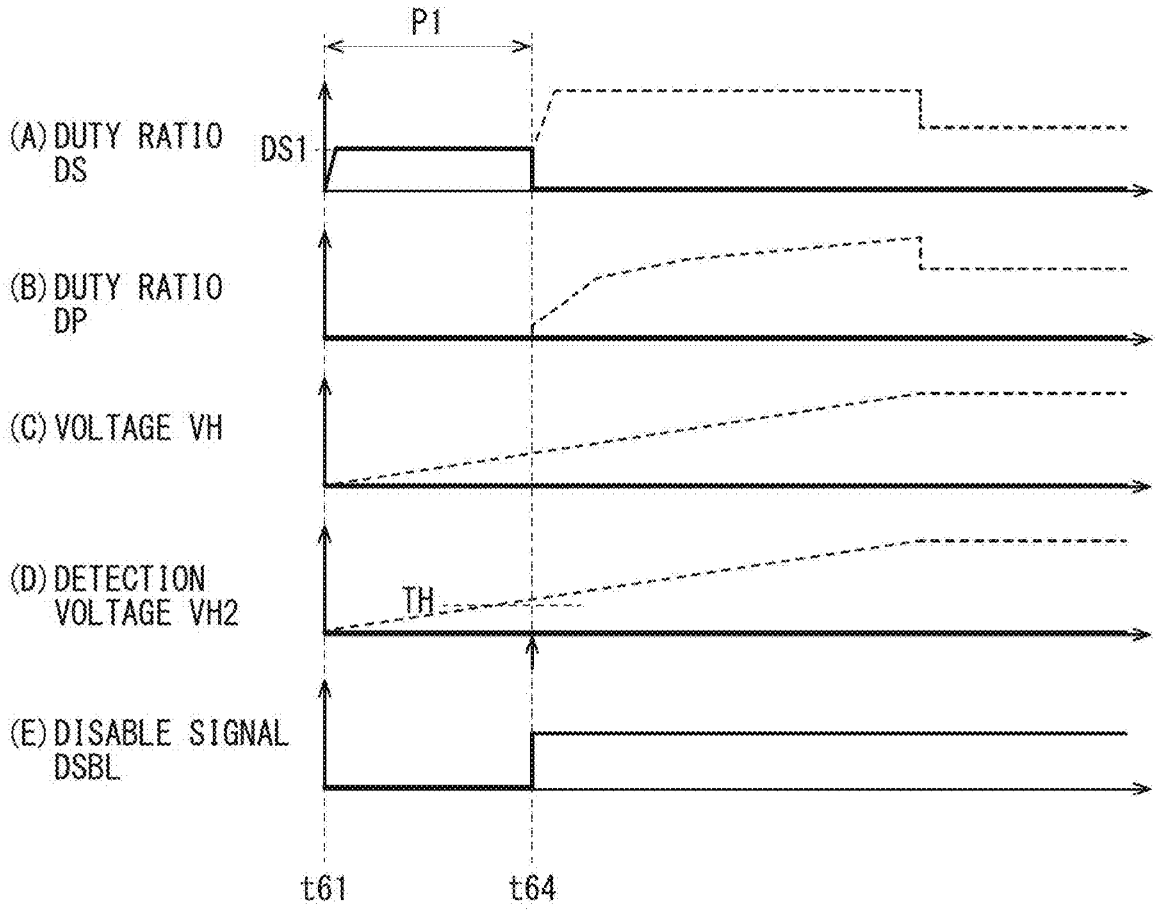

[ FIG. 17C ]
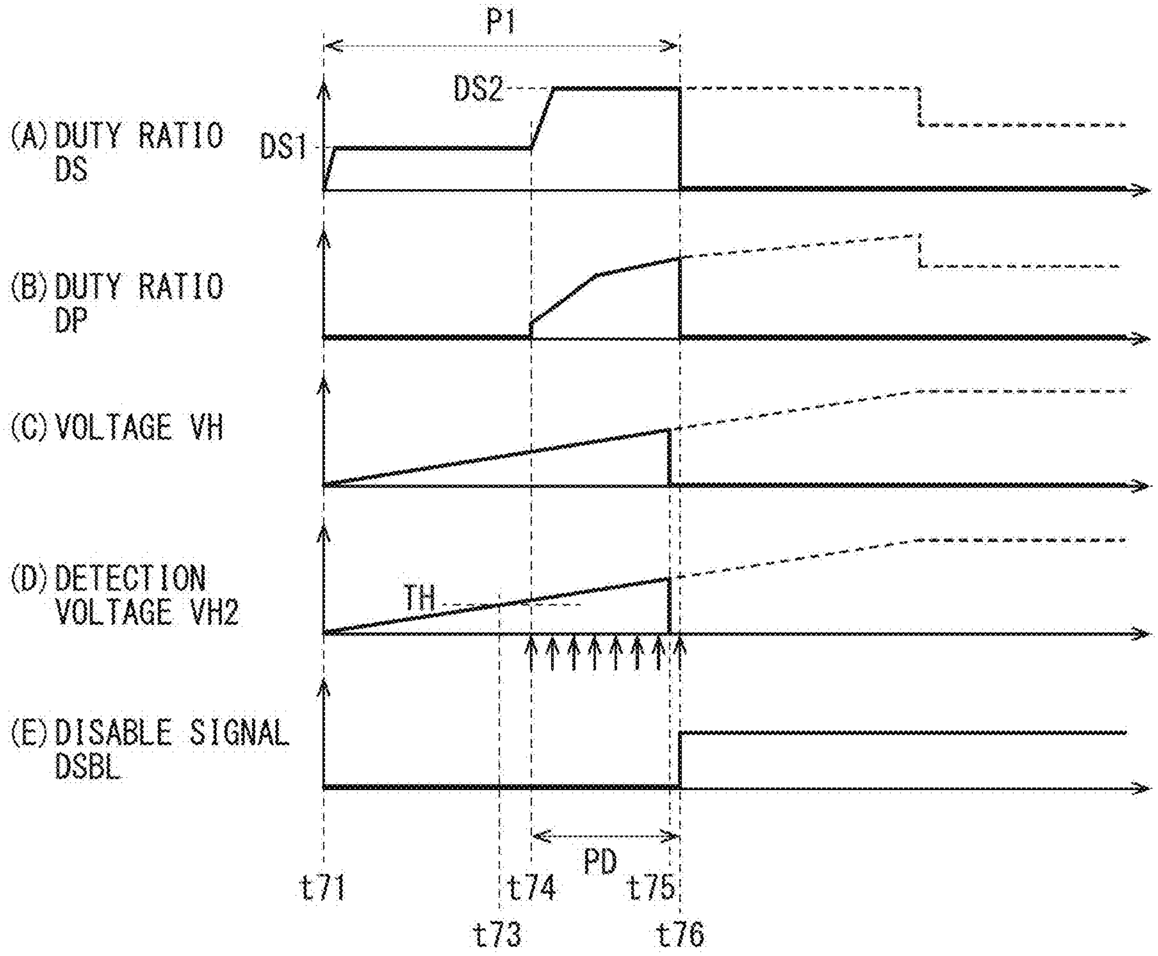

[ FIG. 18A ]
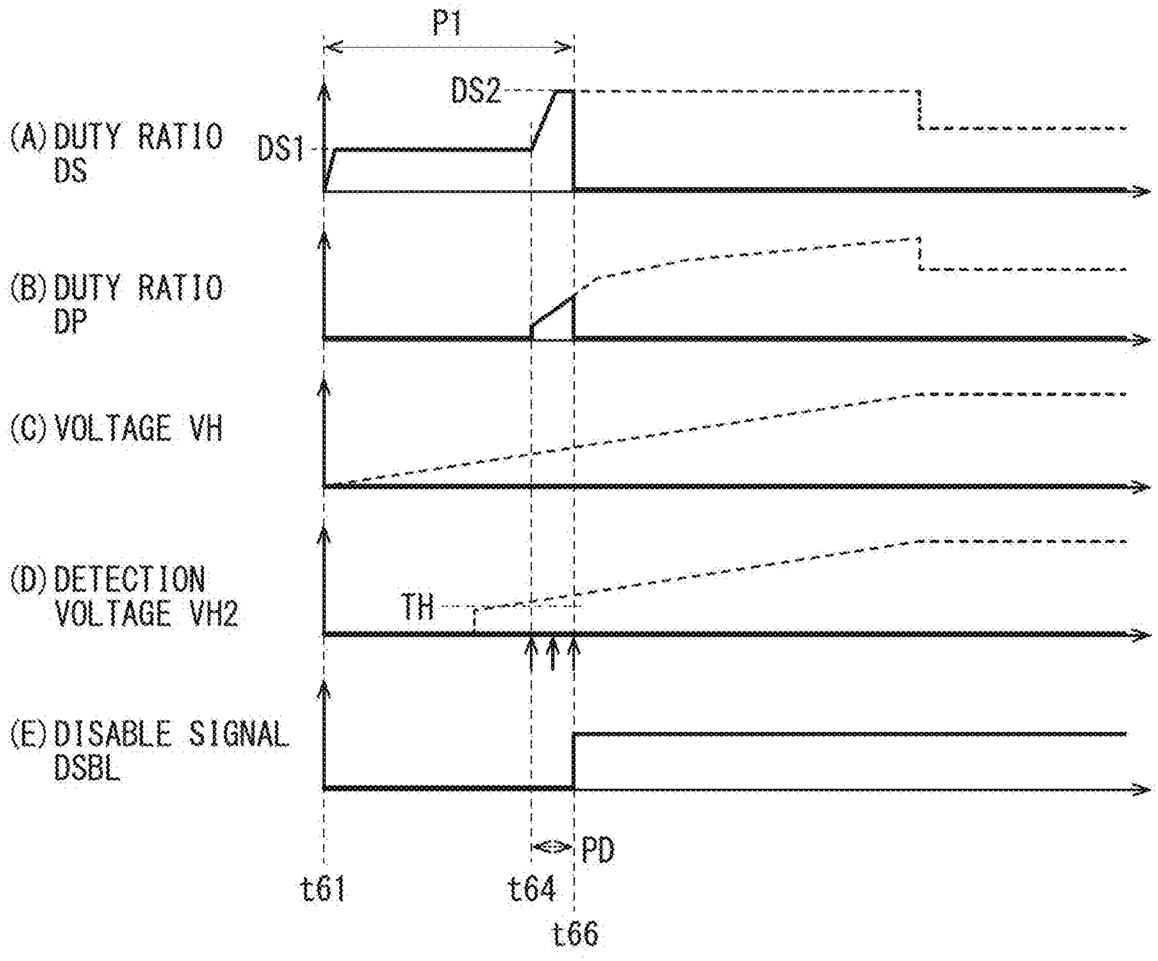

[ FIG. 18B ]
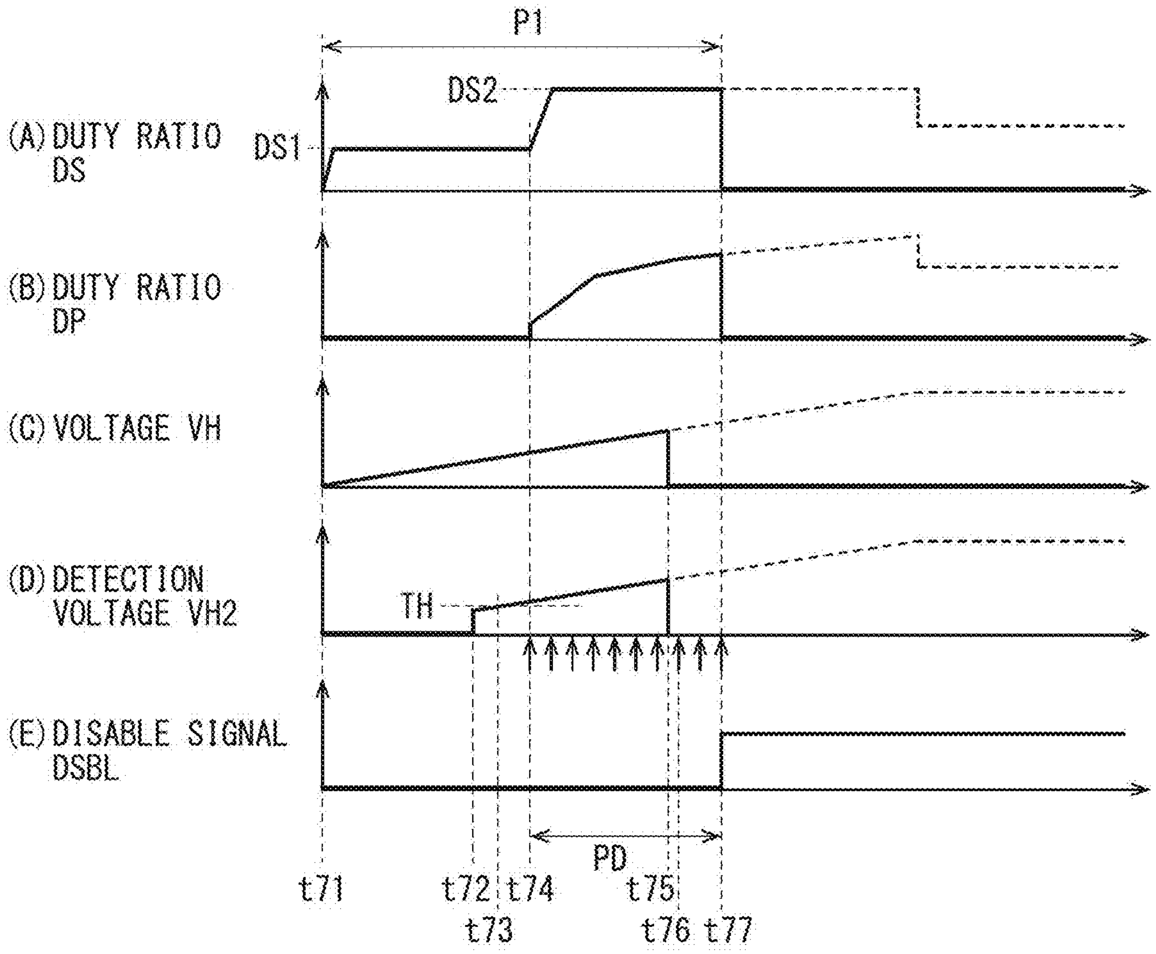

[ FIG. 19A ]
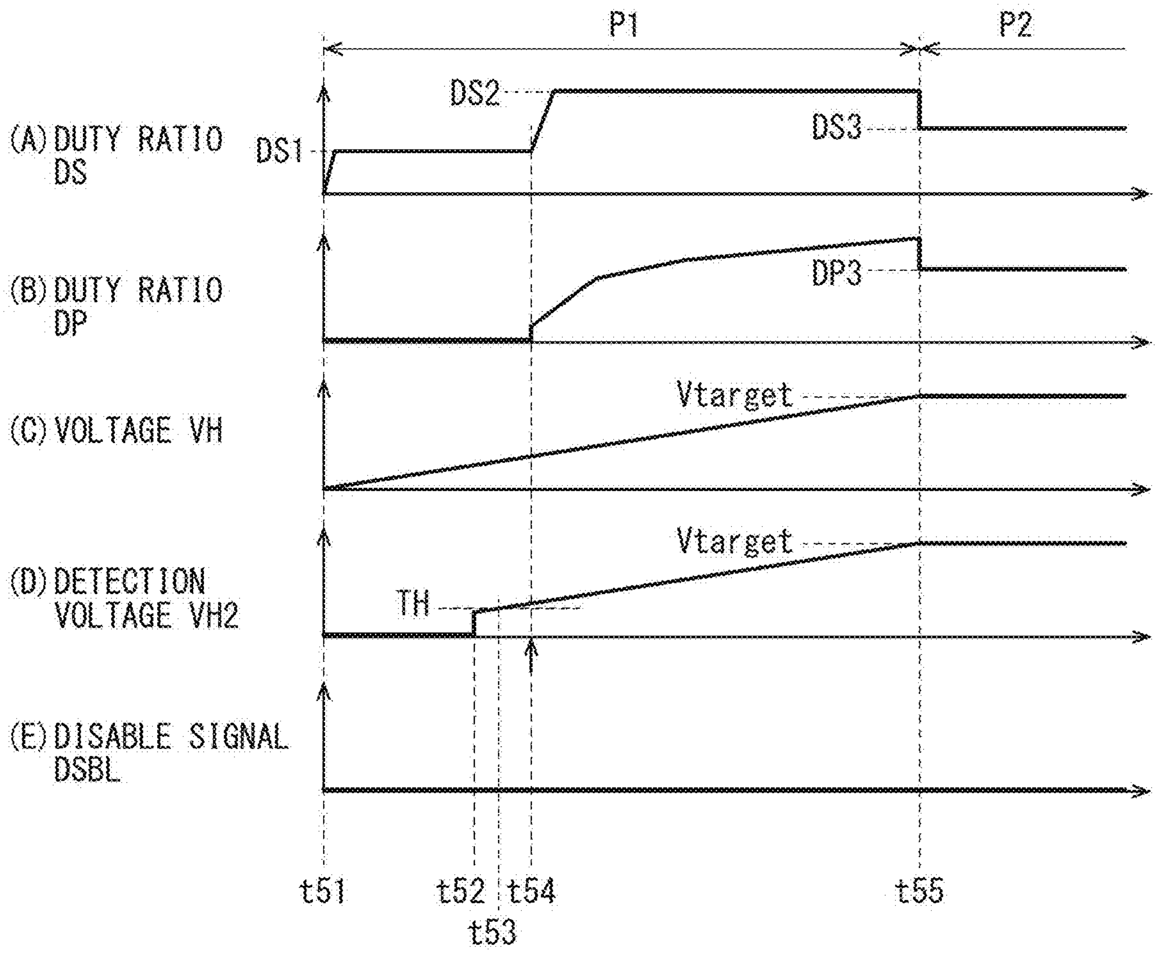

[ FIG. 19B ]
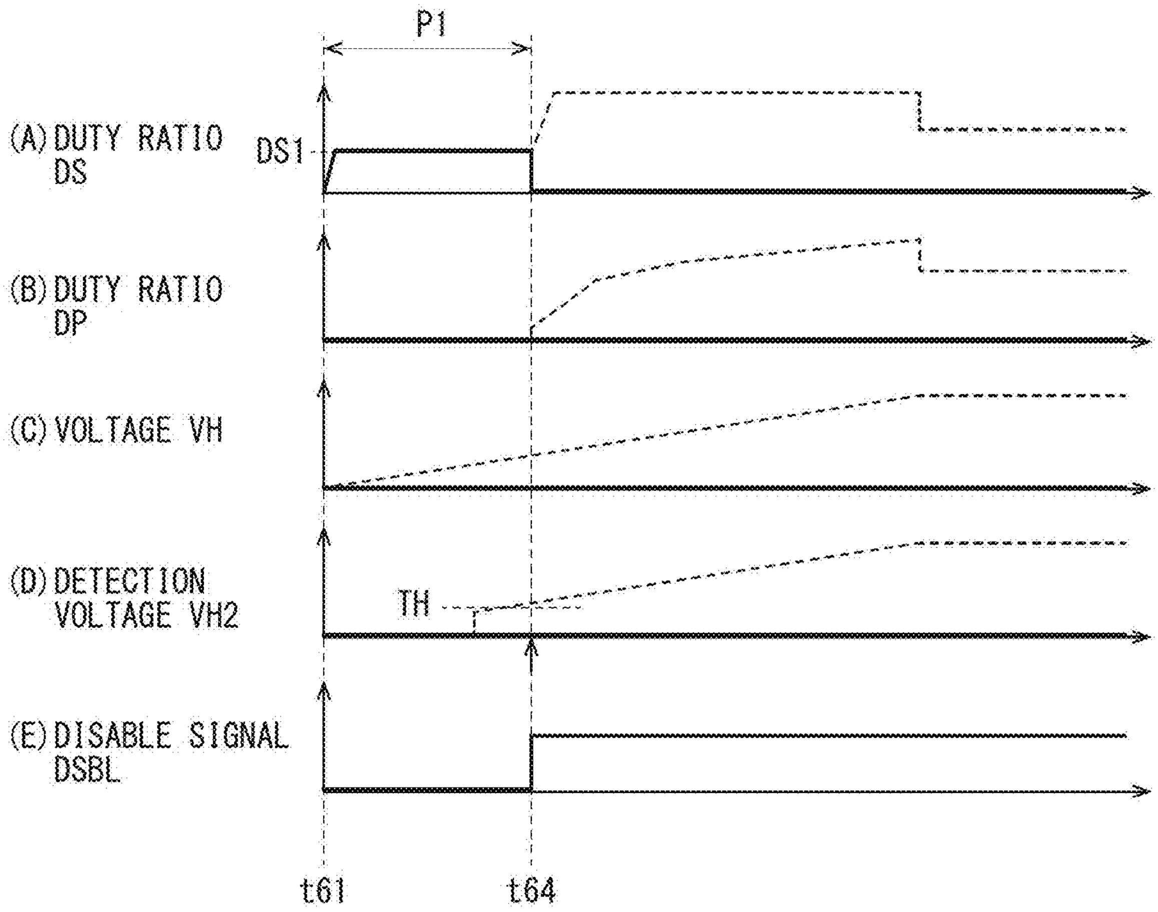

[ FIG. 20 ]
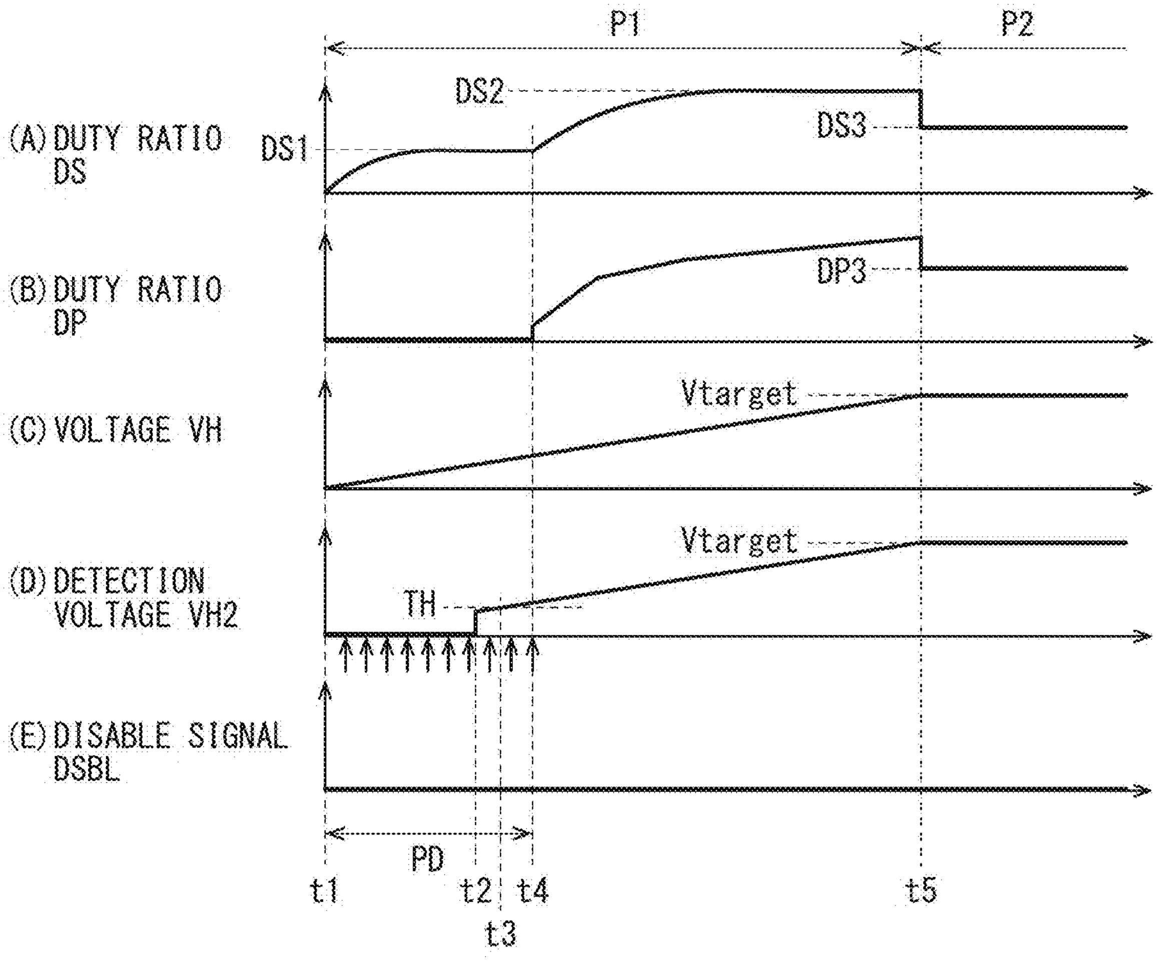

ELECTRIC POWER CONVERSION APPARATUS AND ELECTRIC POWER CONVERSION SYSTEM

TECHNICAL FIELD

The disclosure relates to an electric power conversion apparatus and an electric power conversion system that each convert electric power.

BACKGROUND ART

Some of electric power conversion apparatuses detect an overcurrent. For example, Patent Literature 1 discloses a technique of decreasing, upon occurrence of an overcurrent, a duty ratio of a switching operation to dissipate the overcurrent.

CITATION LIST

Patent Literature

Patent Literature 1: Japanese Unexamined Patent Application Publication No. H6-86454

SUMMARY

An electric power conversion apparatus according to one example embodiment of the disclosure includes a first electric power terminal, a voltage sensor, a switching circuit, a transformer, a rectifying circuit, a smoothing circuit, a second electric power terminal, and a control circuit. The first electric power terminal includes two coupling terminals. The voltage sensor is configured to detect a voltage between the two coupling terminals of the first electric power terminal. The switching circuit is coupled to the first electric power terminal and includes one or more switching devices. The transformer includes a first winding and a second winding. The first winding is coupled to the switching circuit. The rectifying circuit is coupled to the second winding and includes one or more switching devices. The smoothing circuit is coupled to the rectifying circuit and includes an inductor and a first capacitor. The second electric power terminal is coupled to the smoothing circuit. The control circuit is configured to control operations of the switching circuit and the rectifying circuit. The control circuit is configured to cause the rectifying circuit to operate to supply electric power from the second electric power terminal toward the first electric power terminal in a second period that precedes a first period during which electric power is supplied from the first electric power terminal toward the second electric power terminal, and is configured to detect a short circuit between the two coupling terminals by performing, in the second period, a comparison operation of comparing the voltage detected by the voltage sensor with a predetermined threshold voltage.

An electric power conversion system according to one example embodiment of the disclosure includes a first battery, a second capacitor, a first switch, a second switch, an electric power conversion apparatus, and a second battery. The first battery includes a first terminal and a second terminal. The second capacitor includes a first terminal and a second terminal. The first switch is provided on a path coupling the first terminal of the first battery and the first terminal of the second capacitor to each other. The second switch is provided on a path coupling the second terminal of the first battery and the second terminal of the second capacitor to each other. The electric power conversion apparatus includes a first electric power terminal, a voltage sensor, a switching circuit, a transformer, a rectifying circuit, a smoothing circuit, a second electric power terminal, and a control circuit. The first electric power terminal includes a first coupling terminal and a second coupling terminal. The first coupling terminal is coupled to the first terminal of the second capacitor, and the second coupling terminal is coupled to the second terminal of the second capacitor. The voltage sensor is configured to detect a voltage between the first coupling terminal and the second coupling terminal. The switching circuit is coupled to the first electric power terminal and includes one or more switching devices. The transformer includes a first winding and a second winding. The first winding is coupled to the switching circuit. The rectifying circuit is coupled to the second winding and includes one or more switching devices. The smoothing circuit is coupled to the rectifying circuit and includes an inductor and a first capacitor. The second electric power terminal is coupled to the smoothing circuit and the second battery. The control circuit is configured to control operations of the switching circuit and the rectifying circuit. The control circuit is configured to cause the rectifying circuit to operate to supply electric power from the second electric power terminal to the first electric power terminal in a second period that precedes a first period during which electric power is supplied from the first electric power terminal toward the second electric power terminal, and is configured to detect a short circuit between the first coupling terminal and the second coupling terminal by performing, in the second period, a comparison operation of comparing the voltage detected by the voltage sensor with a predetermined threshold voltage.

BRIEF DESCRIPTION OF DRAWINGS

FIG. 3 is a timing diagram illustrating an example operation to be performed by the electric power conversion system illustrated in FIG. 1 in a situation where no short circuit has occurred.

FIG. 4 is a timing waveform diagram illustrating an example operation to be performed by the electric power conversion system illustrated in FIG. 1 in the situation where no short circuit has occurred.

FIG. 5 is a timing diagram illustrating an example operation to be performed by the electric power conversion system illustrated in FIG. 1 in a situation where a short circuit has occurred.

FIG. 6 is a timing waveform diagram illustrating an example operation to be performed by the electric power conversion system illustrated in FIG. 1 in the situation where a short circuit has occurred.

FIG. 7A is a timing diagram illustrating an example operation to be performed by an electric power conversion system according to a modification example of the first example embodiment in the situation where no short circuit has occurred.

FIG. 7B is a timing diagram illustrating an example operation to be performed by the electric power conversion system according to the modification example of the first example embodiment in the situation where a short circuit has occurred.

FIG. 8A is a timing diagram illustrating an example operation to be performed by an electric power conversion system according to another modification example of the first example embodiment in the situation where no short circuit has occurred.

FIG. 8B is a timing diagram illustrating an example operation to be performed by the electric power conversion system according to the other modification example of the first example embodiment in the situation where a short circuit has occurred.

FIG. 9 is a timing diagram illustrating an example operation to be performed by an electric power conversion system according to another modification example of the first example embodiment in the situation where no short circuit has occurred.

FIG. 16A is a timing diagram illustrating an example operation to be performed by the electric power conversion system illustrated in FIG. 15 in the situation where no short circuit has occurred.

FIG. 16B is a timing diagram illustrating an example operation to be performed by the electric power conversion system illustrated in FIG. 15 in the situation where a short circuit has occurred.

FIG. 16C is a timing diagram illustrating an example operation to be performed by the electric power conversion system illustrated in FIG. 15 in a situation where a short circuit has occurred in the middle of the operation.

FIG. 17A is a timing diagram illustrating an example operation to be performed by an electric power conversion system according to a modification example of the second example embodiment in the situation where no short circuit has occurred.

FIG. 17B is a timing diagram illustrating an example operation to be performed by the electric power conversion system according to the modification example of the second example embodiment in the situation where a short circuit has occurred.

FIG. 17C is a timing diagram illustrating an example operation to be performed by the electric power conversion system according to the modification example of the second example embodiment in the situation where a short circuit has occurred in the middle of the operation.

FIG. 18A is a timing diagram illustrating an example operation to be performed by an electric power conversion system according to another modification example of the second example embodiment in the situation where a short circuit has occurred.

FIG. 18B is a timing diagram illustrating an example operation to be performed by the electric power conversion system according to the other modification example of the second example embodiment in the situation where a short circuit has occurred in the middle of the operation.

FIG. 19A is a timing diagram illustrating an example operation to be performed by an electric power conversion system according to another modification example of the second example embodiment in the situation where no short circuit has occurred.

FIG. 19B is a timing diagram illustrating an example operation to be performed by the electric power conversion system according to the other modification example of the second example embodiment in the situation where a short circuit has occurred.

FIG. 20 is a timing diagram illustrating an example operation to be performed by an electric power conversion system according to another modification example of the first example embodiment in the situation where no short circuit has occurred.

DETAILED DESCRIPTION

Some of electric power conversion apparatuses that convert electric power of a primary-side battery and supply the converted electric power to a secondary-side battery perform what is called a precharge operation before performing an electric power conversion operation. The precharge operation is an operation in which electric power of the secondary-side battery is supplied via the electric power conversion apparatus to a capacitor coupled to a primary-side input terminal. It is desired that in the precharge operation, a short circuit occurring at the primary-side input terminal be effectively detectable.

It is desirable to provide an electric power conversion apparatus and an electric power conversion system that each make it possible to effectively detect a short circuit occurring at a primary-side input terminal.

Some example embodiments of the disclosure will be described in detail below with reference to the drawings. Note that the description is given in the following order.

1. First Embodiment
2. Second Embodiment

1. First Example Embodiment

Configuration Example

Figure 1:
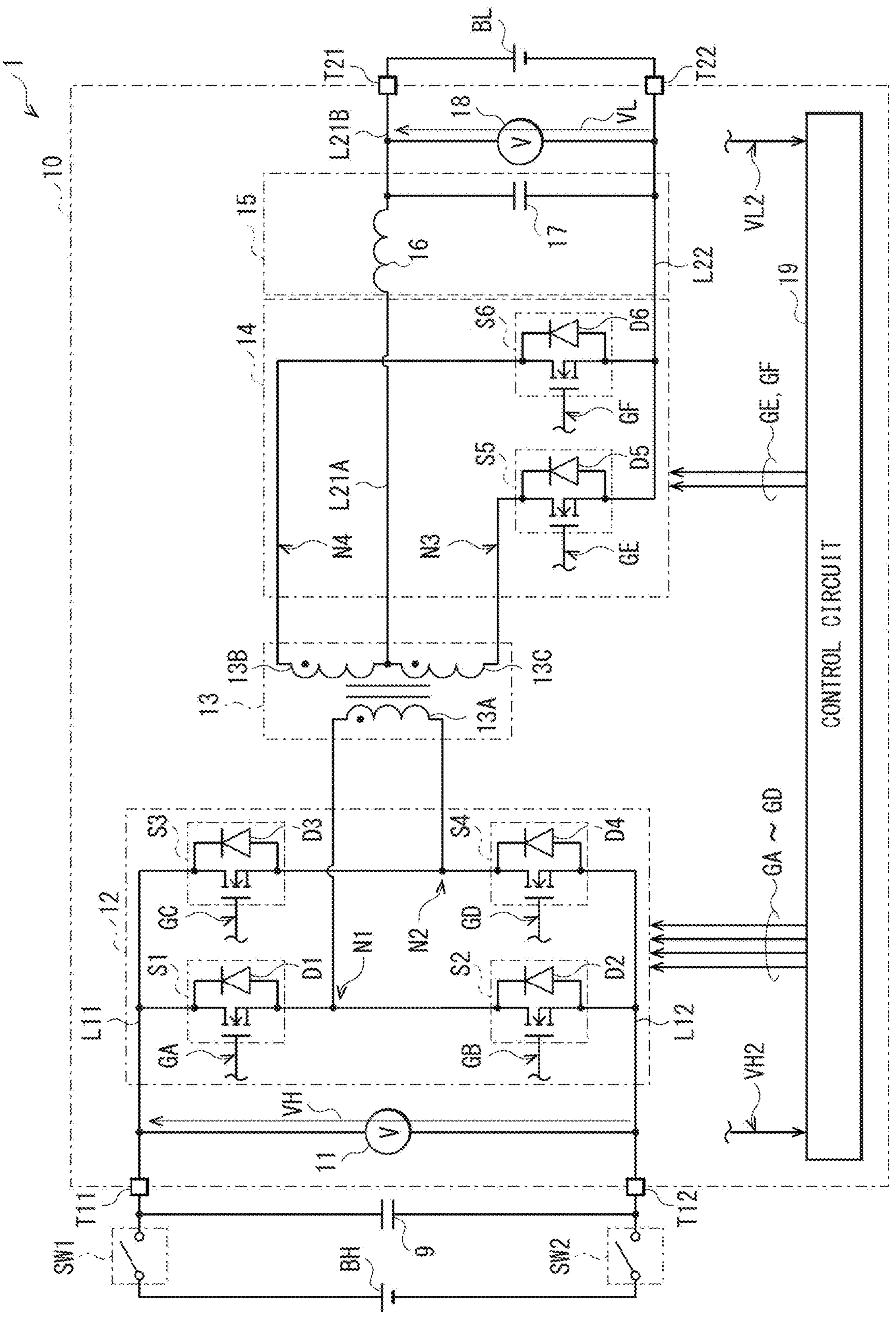
FIG. 1 is a circuit diagram illustrating a configuration example of an electric power conversion system according to one example embodiment of the disclosure.

FIG. 1 illustrates a configuration example of an electric power conversion system 1 including an electric power conversion apparatus according to an example embodiment of the disclosure. The electric power conversion system 1 includes a high voltage battery BH, switches SW1 and SW2, a capacitor 9, an electric power conversion apparatus 10, and a low voltage battery BL. The electric power conversion system 1 is configured to convert electric power supplied from the high voltage battery BH and to supply the converted electric power to the low voltage battery BL.

The high voltage battery BH is configured to store electric power. The high voltage battery BH supplies the electric power to the electric power conversion apparatus 10 via the switches SW1 and SW2.

The switches SW1 and SW2 are configured to supply the electric power stored in the high voltage battery BH to the electric power conversion apparatus 10 by being turned on. The switches SW1 and SW2 each include a relay, for example. The switch SW1 couples a positive terminal of the high voltage battery BH and a terminal T11 of the electric power conversion apparatus 10 to each other by being turned on. The switch SW2 couples a negative terminal of the high voltage battery BH and a terminal T12 of the electric power conversion apparatus 10 to each other by being turned on. The switches SW1 and SW2 are turned on and off in accordance with instructions provided by an unillustrated system controller.

The capacitor 9 has one end coupled to the terminal T11 of the electric power conversion apparatus 10 and to the switch SW1, and another end coupled to the terminal T12 of the electric power conversion apparatus 10 and to the switch SW2.

The electric power conversion apparatus 10 is configured to step down a voltage received from the high voltage battery BH to thereby convert the electric power, and to supply the converted electric power to the low voltage battery BL. The electric power conversion apparatus 10 is what is called a center-tapped electric power conversion apparatus. The electric power conversion apparatus 10 includes the terminals T11 and T12, a voltage sensor 11, a switching circuit 12, a transformer 13, a rectifying circuit 14, a smoothing circuit 15, a voltage sensor 18, a control circuit 19, and terminals T21 and T22. The high voltage battery BH, the switches SW1 and SW2, the capacitor 9, the voltage sensor 11, and the switching circuit 12 configure primary-side circuitry of the electric power conversion system 1. The rectifying circuit 14, the smoothing circuit 15, the voltage sensor 18, and the low voltage battery BL configure secondary-side circuitry of the electric power conversion system 1.

The terminals T11 and T12 are configured to be supplied with a voltage from the high voltage battery BH upon turning-on of the switches SW1 and SW2. In the electric power conversion apparatus 10, the terminal T11 is coupled to a voltage line L11, and the terminal T12 is coupled to a reference voltage line L12.

The voltage sensor 11 is configured to detect a voltage VH at the voltage line L11. The voltage sensor 11 has one end coupled to the voltage line L11, and another end coupled to the reference voltage line L12. The voltage sensor 11 detects the voltage VH at the voltage line L11 relative to a voltage at the reference voltage line L12. Further, the voltage sensor 11 supplies, as a detection voltage VH2, a result of detection of the voltage VH to the control circuit 19. In this example, the voltage VH is supplied as a power-supply voltage to the voltage sensor 11. The voltage sensor 11 operates by being supplied with the voltage VH as the power-supply voltage, as described above, and detects the voltage VH at the voltage line L11. In this example, the voltage VH is supplied as the power-supply voltage directly to the voltage sensor 11; however, this is non-limiting. For example, a voltage obtained as a result of conversion of the voltage VH by an unillustrated electric power conversion apparatus may be supplied. The electric power conversion apparatus may be, for example, an isolated electric power conversion apparatus.

The switching circuit 12 is configured to convert a direct-current voltage supplied from the high voltage battery BH into an alternating-current voltage. The switching circuit 12 is a full-bridge circuit, and includes transistors S1 to S4. The transistors S1 to S4 are switching devices that perform switching operations, respectively based on gate signals GA to GD. The transistors S1 to S4 each include an N-type field-effect transistor (FET), for example. The transistors S1 to S4 include body diodes D1 to D4, respectively. For example, the body diode D1 has an anode coupled to a source of the transistor S1, and a cathode coupled to a drain of the transistor S1. This similarly applies to the body diodes D2 to D4. Note that although the N-type field-effect transistor is used in this example, any switching device may be used without limitation. In addition, although the transistor including the body diode is used in this example, a transistor including no body diode may be used. In such a case, for example, a diode is added instead of the body diode.

The transistor S1 is provided on a path coupling the voltage line L11 and a node N1 to each other, and is configured to couple the node N1 to the voltage line L11 by being turned on. The transistor S1 has the drain coupled to the voltage line L11, a gate to be supplied with the gate signal GA, and the source coupled to the node N1. The transistor S2 is provided on a path coupling the node N1 and the reference voltage line L12 to each other, and is configured to couple the node N1 to the reference voltage line L12 by being turned on. The transistor S2 has a drain coupled to the node N1, a gate to be supplied with the gate signal GB, and a source coupled to the reference voltage line L12. The node N1 is a coupling point between the source of the transistor S1 and the drain of the transistor S2.

The transistor S3 is provided on a path coupling the voltage line L11 and a node N2 to each other, and is configured to couple the node N2 to the voltage line L11 by being turned on. The transistor S3 has a drain coupled to the voltage line L11, a gate to be supplied with the gate signal GC, and a source coupled to the node N2. The transistor S4 is provided on a path coupling the node N2 and the reference voltage line L12 to each other and is configured to couple the node N2 to the reference voltage line L12 by being turned on. The transistor S4 has a drain coupled to the node N2, a gate to be supplied with the gate signal GD, and a source coupled to the reference voltage line L12. The node N2 is a coupling point between the source of the transistor S3 and the drain of the transistor S4.

The transformer 13 is configured to provide direct-current isolation and alternating-current coupling between the primary-side circuitry and the secondary-side circuitry, and to convert an alternating-current voltage supplied from the primary-side circuitry with a transformation ratio N of the transformer 13 to thereby supply the converted alternating-current voltage to the secondary-side circuitry. The transformer 13 includes windings 13A, 13B, and 13C. The winding 13A has one end coupled to the node N1 in the switching circuit 12, and another end coupled to the node N2 in the switching circuit 12. The winding 13B has one end coupled to a node N4 in the rectifying circuit 14, and another end coupled to one end of the winding 13C and to a voltage line L21A. The winding 13C has the one end coupled to the other end of the winding 13B and to the voltage line L21A, and another end coupled to a node N3 in the rectifying circuit 14.

The rectifying circuit 14 is configured to rectify the alternating-current voltage outputted from the windings 13B and 13C of the transformer 13 to thereby generate a pulsating voltage. The rectifying circuit 14 includes transistors S5 and S6. The transistors S5 and S6 are switching devices that perform switching operations, respectively based on gate signals GE and GF. The transistors S5 and S6 each include, for example, an N-type field-effect transistor, as with the transistors S1 to S4. The transistors S5 and S6 include body diodes D5 and D6, respectively. Note that although the N-type field-effect transistor is used in this example, any switching device may be used without limitation. In addition, although the transistor including the body diode is used in this example, a transistor including no body diode may be used. In such a case, for example, a diode is added instead of the body diode to the transistor.

The transistor S5 is provided on a path coupling the node N3 and a reference voltage line L22 to each other, and is configured to couple the node N3 to the reference voltage line L22 by being turned on. The transistor S5 has a drain coupled to the node N3, a gate to be supplied with the gate signal GE, and a source coupled to the reference voltage line L22.

The transistor S6 is provided on a path coupling the node N4 and the reference voltage line L22 to each other, and is configured to couple the node N4 to the reference voltage line L22 by being turned on. The transistor S6 has a drain coupled to the node N4, a gate to be supplied with the gate signal GF, and a source coupled to the reference voltage line L22.

The smoothing circuit 15 is configured to smooth the pulsating voltage of the rectifying circuit 14. The smoothing circuit 15 includes a choke inductor 16 and a capacitor 17. The choke inductor 16 has one end coupled to the voltage line L21A, and another end coupled to a voltage line L21B. The capacitor 17 has one end coupled to the voltage line L21B, and another end coupled to the reference voltage line L22. Note that although the choke inductor 16 is provided between the voltage lines L21A and L21B in this example, this is non-limiting. Alternatively, for example, the choke inductor 16 may be provided on the reference voltage line L22.

The voltage sensor 18 is configured to detect a voltage VL at the voltage line L21B. The voltage sensor 18 has one end coupled to the voltage line L21B, and another end coupled to the reference voltage line L22. The voltage sensor 18 detects the voltage VL at the voltage line L21B relative to a voltage at the reference voltage line L22. Further, the voltage sensor 18 supplies, as a detection voltage VL2, a result of detection of the voltage VL to the control circuit 19.

The control circuit 19 is configured to control an operation of the electric power conversion apparatus 10 by controlling operations of the switching circuit 12 and the rectifying circuit 14, based on the voltage VH (the detection voltage VH2) detected by the voltage sensor 11 and the voltage VL (the detection voltage VL2) detected by the voltage sensor 18. Specifically, the control circuit 19 controls the operation of the electric power conversion apparatus 10 by generating the gate signals GA to GF, based on the detection voltages VH2 and VL2, and performing pulse width modulation (PWM) control through the use of the gate signals GA to GF. The control circuit 19 includes a microcontroller, for example. In one example, the control circuit 19 performs AD conversion of analog signals supplied from the voltage sensors 11 and 18 into digital signals with a predetermined sampling period, and controls the operations of the switching circuit 12 and the rectifying circuit 14, based on the digital signals.

The terminals T21 and T22 are configured to supply a voltage generated by the electric power conversion apparatus 10 to the low voltage battery BL. In the electric power conversion apparatus 10, the terminal T21 is coupled to the voltage line L21B, and the terminal T22 is coupled to the reference voltage line L22. Further, the terminal T21 is coupled to a positive terminal of the low voltage battery BL, and the terminal T22 is coupled to a negative terminal of the low voltage battery BL.

The low voltage battery BL is configured to store the electric power supplied from the electric power conversion apparatus 10.

With this configuration, the electric power conversion system 1 performs an electric power conversion operation of converting electric power supplied from the high voltage battery BH and supplying the converted electric power to the low voltage battery BL, in a time period during which the switches SW1 and SW2 are on.

Further, the electric power conversion system 1 also has a function of performing what is called a precharge operation, that is, an operation of charging the capacitor 9 during a preparation period (a precharge period P1) before the electric power conversion operation described above is started. During the precharge operation, the switches SW1 and SW2 are off, and the control circuit 19 controls the operations of the switching circuit 12 and the rectifying circuit 14 to thereby cause the electric power conversion system 1 to supply the electric power of the low voltage battery BL to the capacitor 9. This makes it possible for the electric power conversion apparatus 10 to reduce an inrush current flowing from the high voltage battery BH to the capacitor 9 when the switches SW1 and SW2 are turned on to perform the electric power conversion operation.

Figure 2:
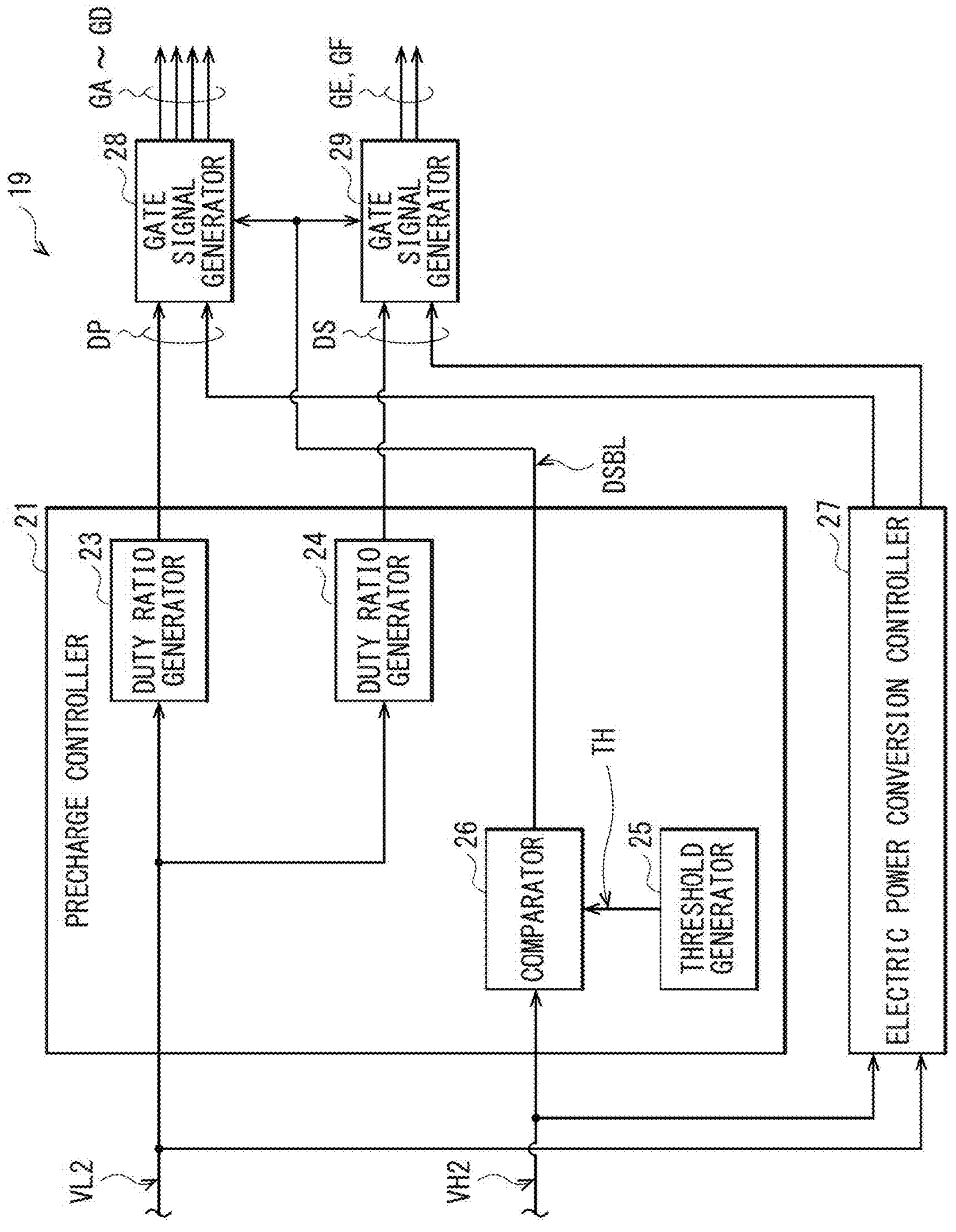
FIG. 2 is a block diagram illustrating a configuration example of a control circuit illustrated in FIG. 1.

FIG. 2 illustrates a configuration example of the control circuit 19. The control circuit 19 includes a precharge controller 21, an electric power conversion controller 27, and gate signal generators 28 and 29.

The precharge controller 21 is configured to, in the precharge period P1 and a time period (a voltage-maintaining period P2) subsequent to the precharge period P1, generate a duty ratio DP of the switching operation of the switching circuit 12 and a duty ratio DS of the switching operation of the rectifying circuit 14, based on the detection voltage VL2. Further, the precharge controller 21 also has a function of generating, based on the detection voltage VH2, a disable signal DSBL indicating whether the control circuit 19 is to stop outputting the gate signals GA to GF. The precharge controller 21 includes duty ratio generators 23 and 24, a threshold generator 25, and a comparator 26.

The duty ratio generator 23 is configured to generate the duty ratio DP of the switching circuit 12, based on the detection voltage VL2, in the precharge period P1 and the voltage-maintaining period P2. Specifically, in the precharge period P1, the duty ratio generator 23 so generates the duty ratio DP that the higher the detection voltage VL2, the lower the duty ratio DP. For example, in the precharge period P1, the duty ratio generator 23 so generates the duty ratio DP that the duty ratio DP increases. This makes it possible to adjust a charging voltage at the capacitor 9 in the electric power conversion system 1. Further, in the voltage-maintaining period P2, the duty ratio generator 23 generates the duty ratio DP of a predetermined value corresponding to the detection voltage VL2, for example. Note that this is non-limiting, and the duty ratio generator 23 may, in the voltage-maintaining period P2, change the duty ratio DP by performing feedback control, based on the detection voltage VL2.

The duty ratio generator 24 is configured to generate the duty ratio DS of the rectifying circuit 14, based on the detection voltage VL2, in the precharge period P1 and the voltage-maintaining period P2. Specifically, in the precharge period P1, the duty ratio generator 24 so generates the duty ratio DS that the higher the detection voltage VL2, the lower the duty ratio DS. For example, in the precharge period P1, the duty ratio generator 24 so generates the duty ratio DS that the duty ratio DS increases. This makes it possible to adjust the charging voltage at the capacitor 9 in the electric power conversion system 1. Further, in the voltage-maintaining period P2, the duty ratio generator 24 generates the duty ratio DS of a predetermined value corresponding to the detection voltage VL2, for example. Note that this is non-limiting, and the duty ratio generator 24 may, in the voltage-maintaining period P2, change the duty ratio DS by performing feedback control, based on the detection voltage VL2.

The threshold generator 25 is configured to generate a threshold TH of the detection voltage VH2. The threshold TH is used to determine whether the terminals T11 and T12 are short-circuited to each other. The terminals T11 and T12 can be short-circuited when both ends of the capacitor 9 are short-circuited, for example.

The comparator 26 is configured to generate the disable signal DSBL by making a comparison between the detection voltage VH2 and the threshold TH. Specifically, the comparator 26 makes the comparison between the detection voltage VH2 and the threshold TH a plurality of number of times in a time period (a comparison period PD described later) from a start of the precharge period P1 to an elapse of a predetermined time (e.g., 100 [msec.]). If the detection voltage VH2 is constantly lower than the threshold TH in the comparison period PD, the comparator 26 sets the disable signal DSBL active (e.g., at a high level) at an end timing of the comparison period PD. That is, when a short circuit has occurred between the terminals T11 and T12, the voltage VH does not rise even in an attempt to raise the voltage VH by the precharge operation, for example, and accordingly, the detection voltage VH2 does not rise, either. Thus, if the detection voltage VH2 is constantly lower than the threshold TH in the comparison period PD, the comparator 26 determines that a short circuit has occurred between the terminals T11 and T12 due to some factors, and sets the disable signal DSBL active. Further, if the detection voltage VH2 rises higher than the threshold TH by the end of the comparison period PD, the comparator 26 sets the disable signal DSBL inactive (e.g., at a low level) at the end timing of the comparison period PD. That is, when no short circuit has occurred between the terminals T11 and T12, the voltage VH gradually rises as a result of the precharge operation, and accordingly, the detection voltage VH2 rises higher than the threshold TH by the end of the comparison period PD. Thus, if the detection voltage VH2 rises higher than the threshold TH by the end of the comparison period PD, the comparator 26 determines that no short circuit has occurred between the terminals T11 and T12, and sets the disable signal DSBL inactive (e.g., at the low level).

The electric power conversion controller 27 is configured to generate, in a time period during which the electric power conversion operation is performed (an electric power conversion period P3), the duty ratio DP of the switching operation of the switching circuit 12 and the duty ratio DS of the switching operation of the rectifying circuit 14, based on the detection voltages VH2 and VL2.

The gate signal generator 28 is configured to generate the gate signals GA to GD, based on the duty ratio DP generated by the duty ratio generator 23 or the electric power conversion controller 27, and the disable signal DSBL. Specifically, in the precharge period P1 and the voltage-maintaining period P2, when the disable signal DSBL is inactive, the gate signal generator 28 generates the gate signals GC and GD, based on the duty ratio DP generated by the duty ratio generator 23, and maintains the gate signals GA and GB at the low level; and when the disable signal DSBL is active, the gate signal generator 28 maintains the gate signals GA to GD at the low level. Further, in the electric power conversion period P3, the gate signal generator 28 generates the gate signals GA to GD, based on the duty ratio DP generated by the electric power conversion controller 27.

The gate signal generator 29 is configured to generate the gate signals GE and GF, based on the duty ratio DS generated by the duty ratio generator 24 or the electric power conversion controller 27, and the disable signal DSBL. Specifically, in the precharge period P1 and the voltage-maintaining period P2, when the disable signal DSBL is inactive, the gate signal generator 29 generates the gate signals GE and GF, based on the duty ratio DS generated by the duty ratio generator 24; and when the disable signal DSBL is active, the gate signal generator 29 maintains the gate signals GE and GF at the low level. Further, in the electric power conversion period P3, the gate signal generator 29 generates the gate signals GE and GF, based on the duty ratio DS generated by the electric power conversion controller 27.

Here, the terminals T11 and T12 correspond to a specific example of a "first electric power terminal" in one embodiment of the disclosure. The terminal T11 corresponds to a specific example of a "first coupling terminal" in one embodiment of the disclosure. The terminal T12 corresponds to a specific example of a "second coupling terminal" in one embodiment of the disclosure. The voltage sensor 11 corresponds to a specific example of a "voltage sensor" in one embodiment of the disclosure. The switching circuit 12 corresponds to a specific example of a "switching circuit" in one embodiment of the disclosure. The transformer 13 corresponds to a specific example of a "transformer" in one embodiment of the disclosure. The rectifying circuit 14 corresponds to a specific example of a "rectifying circuit" in one embodiment of the disclosure. The smoothing circuit 15 corresponds to a specific example of a "smoothing circuit" in one embodiment of the disclosure. The choke inductor 16 corresponds to a specific example of an "inductor" in one embodiment of the disclosure. The capacitor 17 corresponds to a specific example of a "first capacitor" in one embodiment of the disclosure. The terminals T21 and T22 correspond to a specific example of a "second electric power terminal" in one embodiment of the disclosure. The control circuit 19 corresponds to a specific example of a "control circuit" in one embodiment of the disclosure. The precharge period P1 corresponds to a specific example of a "second period" in one embodiment of the disclosure. The electric power conversion period P3 corresponds to a specific example of a "first period" in one embodiment of the disclosure. The threshold TH corresponds to a specific example of a "threshold voltage" in one embodiment of the disclosure. The high voltage battery BH corresponds to a specific example of a "first battery" in one embodiment of the disclosure. The capacitor 9 corresponds to a specific example of a "second capacitor" in one embodiment of the disclosure. The switch SW1 corresponds to a specific example of a "first switch" in one embodiment of the disclosure. The switch SW2 corresponds to a specific example of a "second switch" in one embodiment of the disclosure. The electric power conversion apparatus 10 corresponds to a specific example of an "electric power conversion apparatus" in one embodiment of the disclosure. The low voltage battery BL corresponds to a specific example of a "second battery" in one embodiment of the disclosure.

[Operation and Workings]

Next, a description will be given of operation and workings of the electric power conversion system 1 of the present example embodiment.

(Outline of Overall Operation)

First, an outline of an overall operation of the electric power conversion system 1 will be described with reference to FIG. 1. In the precharge period P1, the switches SW1 and SW2 are off, the control circuit 19 generates the gate signals GC to GF, based on the voltages VH and VL, and maintains the gate signals GA and GB at the low level. This causes the switching circuit 12 and the rectifying circuit 14 to operate and causes the electric power conversion apparatus 10 to supply electric power of the low voltage battery BL to the capacitor 9. As a result, the capacitor 9 is charged, which raises the voltage VH. When the voltage VH reaches a target voltage Vtarget, for example, the precharge operation ends, and the voltage VH is maintained at or near the target voltage Vtarget. Thereafter, in the electric power conversion period P3, the switches SW1 and SW2 are turned on, and the control circuit 19 generates the gate signals GA to GF, based on the voltages VH and VL. This causes the electric power conversion apparatus 10 to convert the electric power supplied from the high voltage battery BH and to supply the converted electric power to the low voltage battery BL.

(Detailed Operation)

FIG. 3 illustrates an example of the precharge operation to be performed in a situation where no short circuit has occurred between the terminals T11 and T12. In FIG. 3, part (A) illustrates the duty ratio DS of the switching operation of the rectifying circuit 14, part (B) illustrates the duty ratio DP of the switching operation of the switching circuit 12, part (C) illustrates a waveform of the voltage VH, part (D) illustrates a waveform of the result of detection by the voltage sensor 11, that is, the detection voltage VH2, and part (E) illustrates a waveform of the disable signal DSBL.

In this example, the electric power conversion system 1 performs the precharge operation in a time period from a timing t1 to a timing t5 (the precharge period P1).

First, in a time period from the timing t1 to a timing t4, the duty ratio generator 24 of the precharge controller 21 sets the duty ratio DS to a value DS1 (part (A) of FIG. 3). The time period from the timing t1 to the timing t4 has a time length of, for example, 100 [msec.], and the timing t4 is set based on a timer of the control circuit 19, for example. The gate signal generator 29 generates the gate signals GE and GF, based on the duty ratio DS generated by the precharge controller 21, and the rectifying circuit 14 performs the switching operation, based on the gate signals GE and GF. Further, in the time period from the timing t1 to the timing t4, the duty ratio generator 23 sets the duty ratio DP to "0" (zero) (part (B) of FIG. 3). The gate signal generator 28 maintains the gate signals GA to GD at the low level, based on the duty ratio DP generated by the precharge controller 21, and the switching circuit 12 keeps the transistors S1 to S4 off, based on the gate signals GA to GD. In such a manner, the rectifying circuit 14 performs the switching operation, and as a result, the voltage VH at the capacitor 9 gradually rises (part (C) of FIG. 3).

During a time period from the timing t1 to a timing t2, the detection voltage VH2 is 0 V (part (D) of FIG. 3). That is, in this example, the voltage sensor 11 operates by being supplied with the voltage VH as the power-supply voltage, and is thus not operable when the voltage VH is sufficiently low. At the timing t2, the voltage VH reaches a voltage high enough to cause the voltage sensor 11 to operate, and the voltage sensor 11 starts operating at the timing t2. This causes the detection voltage VH2 to reach a voltage corresponding to the voltage VH at and after the timing t2.

In this example, in the time period from the timing t1 to the timing t4 (the comparison period PD), the comparator 26 of the precharge controller 21 makes the comparison between the detection voltage VH2 and the threshold TH every time 10 [msec.] elapses, for example (part (D) of FIG. 3). In part (D) of FIG. 3, arrows indicate comparison timings at each of which the comparator 26 makes the comparison. In this example, the detection voltage VH2 is lower than the threshold TH before the timing t3, and is higher than the threshold TH after the timing t3. Thus, the detection voltage VH2 is higher than the threshold TH in two comparison operations after the timing t3. Because the detection voltage VH2 rises higher than the threshold TH by the end of the comparison period PD as described above, the comparator 26 keeps the disable signal DSBL inactive (at the low level in this example) at and after the timing t4 that is the end timing of the comparison period PD (part (E) of FIG. 3).

In a time period from the timing t4 to the timing t5, the duty ratio generator 24 of the precharge controller 21 sets the duty ratio DS to a value DS2 that is higher than the value DS1 (part (A) of FIG. 3). Because the disable signal DSBL is inactive, the gate signal generator 29 generates the gate signals GE and GF, based on the duty ratio DS generated by the precharge controller 21, and the rectifying circuit 14 performs the switching operation, based on the gate signals GE and GF. This causes the duty ratio DS of the switching operation of the rectifying circuit 14 to change from the value DS1 to the value DS2, as illustrated in part (A) of FIG. 3. Further, in the time period from the timing t4 to the timing t5, the duty ratio generator 24 of the precharge controller 21 so generates the duty ratio DP that the duty ratio DP gradually increases (part (B) of FIG. 3). Because the disable signal DSBL is inactive, the gate signal generator 28 generates the gate signals GC and GD, based on the duty ratio DP generated by the precharge controller 21, and maintains the gate signals GA and GB at the low level, and the switching circuit 12 performs the switching operation, based on the gate signals GA to GD. This causes the duty ratio DP of the switching operation of the switching circuit 12 to gradually increase in the time period from the timing t4 to the timing t5, as illustrated in part (B) of FIG. 3. In such a manner, the switching circuit 12 and the rectifying circuit 14 perform the switching operations, and as a result, the voltage VH at the capacitor 9 gradually rises (part (C) of FIG. 3).

When the detection voltage VH2 reaches the target voltage Vtarget at the timing t5, the electric power conversion system 1 performs a voltage-maintaining operation of maintaining the voltage VH at or near the target voltage Vtarget in a time period from the timing t5 (the voltage-maintaining period P2). Specifically, at and after the timing t5, the duty ratio generator 24 of the precharge controller 21 sets the duty ratio DS to a value DS3 that is lower than the value DS2 (part (A) of FIG. 3). The gate signal generator 29 generates the gate signals GE and GF, based on the duty ratio DS generated by the precharge controller 21, and the rectifying circuit 14 performs the switching operation, based on the gate signals GE and GF. Further, at and after the timing t5, the duty ratio generator 23 of the precharge controller 21 sets the duty ratio DP to a value DP3 that is lower than an immediately previous value (part (B) of FIG. 3). The gate signal generator 28 generates the gate signals GC and GD, based on the duty ratio DP generated by the precharge controller 21, and maintains the gate signals GA and GB at the low level, and the switching circuit 12 performs the switching operation, based on the gate signals GA to GD. In such a manner, the switching circuit 12 and the rectifying circuit 14 perform the switching operations, and as a result, the voltage VH at the capacitor 9 is maintained at or near the target voltage Vtarget (part (C) of FIG. 3).

Here, the time period from the timing t1 to the timing t4 corresponds to a specific example of a "first sub-period" in one embodiment of the disclosure. The value DS1 of the duty ratio DS corresponds to a specific example of a "first duty ratio" in one embodiment of the disclosure. For example, the time period from the timing t4 to the timing t5 corresponds to a specific example of a "second sub-period" in one embodiment of the disclosure. The value DS2 of the duty ratio DS corresponds to a specific example of a "second duty ratio" in one embodiment of the disclosure.

FIG. 4 illustrates examples of simulated operation waveforms in the time period from the timing t1 to the timing t4 in FIG. 3. In FIG. 4, part (A) illustrates a waveform of the gate signal GE or GF, part (B) illustrates a waveform of the gate signal GC or GD, part (C) illustrates a waveform of a current (a charge current ICHG) flowing into the capacitor 9, part (D) illustrates a waveform of an excitation current IM of the transformer 13, part (E) illustrates a current (an inductor current IL) flowing from the voltage line L21B to the voltage line L21A in the choke inductor 16, part (F) illustrates a waveform of a voltage (a transformer voltage VTR1) at the node N1 relative to the node N2 in the winding 13A of the transformer 13, and part (G) illustrates a waveform of the voltage VH. In FIG. 4, Tsw represents a period of the switching operation (switching period).

The control circuit 19 generates the gate signals GC and GD, based on the duty ratio DP, and generates the gate signals GE and GF, based on the duty ratio DS. The duty ratio DP represents a pulse width of each of the gate signals GC and GD with respect to a time length of the switching period Tsw taken as "1", and the duty ratio DS represents a pulse width of each of the gate signals GE and GF with respect to the time length of the switching period Tsw taken as "1". Note that, during the time period from the timing t1 to the timing t4 in FIG. 3, the duty ratio DP is 0 (zero) and the gate signals GC and GD thus remain at the low level.

At a timing t11, the control circuit 19 changes the gate signal GF from the low level to the high level (part (A) of FIG. 4). This causes the transistor S6 to switch from off to on. Thereafter, at a timing t12 at which a time corresponding to the duty ratio DS (duty ratio DS×switching period Tsw) has elapsed from the timing t11, the control circuit 19 changes the gate signal GF from the high level to the low level. This causes the transistor S6 to switch from on to off.

In a time period from the timing t11 to the timing t12 during which the transistor S6 is on, a current flows through the choke inductor 16, the winding 13B of the transformer 13, and the transistor S6 in order. The inductor current IL gradually increases in the time period from the timing t11 to the timing t12 (part (E) of FIG. 4). Thereafter, at the timing t12 at which the transistor S6 switches from on to off, the inductor current IL decreases toward 0 (zero) and thereafter remains at 0 (zero).

The excitation current IM increases in the time period from the timing t11 to the timing t12, and decreases in a time period from the timing t12 to a timing t13 (part (D) of FIG. 4). Accordingly, the charge current ICHG also increases in the time period from the timing t11 to the timing t12, and decreases in the time period from the timing t12 to the timing t13 (part (C) of FIG. 4).

At the timing t13, the control circuit 19 changes the gate signal GE from the low level to the high level (part (A) of FIG. 4). This causes the transistor S5 to switch from off to on. Thereafter, at a timing t14 at which the time corresponding to the duty ratio DS (duty ratio DS×switching period Tsw) has elapsed from the timing t13, the control circuit 19 changes the gate signal GE from the high level to the low level. This causes the transistor S5 to switch from on to off.

In a time period from the timing t13 to the timing t14 during which the transistor S5 is on, a current flows through the choke inductor 16, the winding 13C of the transformer 13, and the transistor S5 in order. The inductor current IL gradually increases in the time period from the timing t13 to the timing t14 (part (E) of FIG. 4). Thereafter, at the timing t14 at which the transistor S5 switches from on to off, the inductor current IL decreases toward 0 (zero) and thereafter remains at 0 (zero).

The excitation current IM decreases in the time period from the timing t13 to the timing t14, and increases in a time period from the timing t14 to a timing t15 (part (D) of FIG. 4). Accordingly, the charge current ICHG increases in the time period from the timing t13 to the timing t14, and decreases in the time period from the timing t14 to the timing t15 (part (C) of FIG. 4).

As described above, the charge current ICHG flows in a time period from the timing t11 to the timing t15. The charge current ICHG flowing into the capacitor 9 charges the capacitor 9, and the voltage VH gradually increases accordingly.

Note that although FIG. 4 illustrates the operation in the time period from the timing t1 to the timing t4 in FIG. 3, the operation in the time period from the timing t4 to the timing t5 is performed in a similar manner, and the voltage VH is gradually increased by the charge current ICHG. From the timing t4 to the timing t5, the switching circuit 12 performs the switching operation, based on the gate signals GC and GD. In the time period from the timing t4 to the timing t5 also, the inductor current IL gradually increases in a certain time period, thereafter decreases toward 0 (zero), and thereafter remains at 0 (zero), as illustrated in part (E) of FIG. 4.

FIG. 5 illustrates an example of the precharge operation to be performed in a situation where a short circuit has occurred between the terminals T11 and T12. In FIG. 5, waveforms indicated by dotted lines represent waveforms for the situation case where a short circuit has occurred between the terminals T11 and T12 (FIG. 3). Timings t21 and t24 correspond to the timings t1 and t4 in the example of FIG. 3, respectively.

In a time period from the timing t21 to the timing t24, the electric power conversion system 1 sets the duty ratio DS to the value DS1, and sets the duty ratio DP to "0" (zero) (parts (A) and (B) of FIG. 5), as in the time period from the timing t1 to the timing t4 illustrated in FIG. 3. In this example, the short circuit has occurred between the terminals T11 and T12; therefore, the voltage VH at the capacitor 9 does not rise and thus remains at 0 V (part (C) of FIG. 5). Because the voltage VH remains at 0 V as described above, the voltage sensor 11 is not operable, and the detection voltage VH2 also remains at 0 V (part (D) of FIG. 5).

In the time period from the timing t21 to the timing t24 (the comparison period PD), the comparator 26 of the precharge controller 21 makes the comparison between the detection voltage VH2 and the threshold TH every time 10 [msec.] elapses, for example (part (D) of FIG. 5). In this example, because the short circuit has occurred between the terminals T11 and T12, the detection voltage VH2 is lower than the threshold TH over the entire time period from the timing t21 to the timing t24. Thus, the comparator 26 sets the disable signal DSBL active (at the high level in this example) at the timing t24 that is the end timing of the comparison period PD. In such a manner, the control circuit 19 detects the short circuit occurring between the terminals T11 and T12.

Because the disable signal DSBL is active, the gate signal generator 29 generates the gate signals GE and GF to be maintained at the low level, regardless of the duty ratio DS generated by the precharge controller 21, and the rectifying circuit 14 stops the switching operation, based on the gate signals GE and GF. This causes the duty ratio DS of the switching operation of the rectifying circuit 14 to become 0 (zero), as illustrated in part (A) of FIG. 5. Similarly, because the disable signal DSBL is active, the gate signal generator 28 generates the gate signals GA to GD to be maintained at the low level, regardless of the duty ratio DP generated by the precharge controller 21, and the switching circuit 12 maintains the stop of the switching operation, based on the gate signals GA to GD. This causes the duty ratio DP of the switching operation of the switching circuit 12 to become 0 (zero), as illustrated in part (B) of FIG. 5. In such a manner, the electric power conversion system 1 temporarily stops the precharge operation.

Thereafter, upon the lapse of a predetermined time, for example, the electric power conversion system 1 restarts the precharge operation and checks whether the short circuit is present between the terminals T11 and T12. For example, the electric power conversion system 1 starts performing the precharge operation a plurality of number of times, and completely stops the operation if the short circuit is still present between the terminals T11 and T12. Further, the electric power conversion system 1 issues a notification indicating the occurrence of short circuit between the terminals T11 and T12 to an external device, for example.

FIG. 6 illustrates examples of simulated operation waveforms in the time period from the timing t21 to the timing t24 in FIG. 5. Each waveform in FIG. 6 has a scale along a vertical axis that is the same as a scale along a vertical axis of each wave in FIG. 4.

At a timing t31, the control circuit 19 changes the gate signal GF from the low level to the high level (part (A) of FIG. 6). This causes the transistor S6 to switch from off to on. Thereafter, at a timing t32 at which the time corresponding the duty ratio DS (duty ratio DS×switching period Tsw) has elapsed from the timing t31, the control circuit 19 changes the gate signal GF from the high level to the low level. This causes the transistor S6 to switch from on to off.

In a time period from the timing t31 to the timing t32 during which the transistor S6 is on, a current flows through the choke inductor 16, the winding 13B of the transformer 13, and the transistor S6 in order. The inductor current IL gradually increases in the time period from the timing t31 to the timing t32 (part (E) of FIG. 6). The inductor current IL is greater in amount than the inductor current IL flowing when no short circuit has occurred between the terminals T11 and T12 (part (E) of FIG. 4). At the timing t32 at which the transistor S6 switches from on to off, the inductor current IL decreases toward 0 (zero), and thereafter remains at 0 (zero).

In this example, because the short circuit has occurred between the terminals T11 and T12, substantially no excitation current IM flows (part (D) of FIG. 6). The charge current ICHG gradually increases in accordance with the inductor current IL in the time period from the timing t31 to the timing t32, and decreases toward 0 (zero) at the timing t32 at which the transistor S6 switches from on to off (part (C) of FIG. 6).

Thereafter, at a timing t33, the control circuit 19 changes the gate signal GE from the low level to the high level (part (A) of FIG. 6). This causes the transistor S5 to switch from off to on. Thereafter, at a timing t34 at which the time corresponding to the duty ratio DS (duty ratio DS×switching period Tsw) has elapsed from the timing t33, the control circuit 19 changes the gate signal GE from the high level to the low level. This causes the transistor S5 to switch from on to off.

In a time period from the timing t33 to the timing t34 during which the transistor S5 is on, a current flows through the choke inductor 16, the winding 13C of the transformer 13, and the transistor S5 in order. The inductor current IL gradually increases in the time period from the timing t33 to the timing t34 (part (E) of FIG. 6). Thereafter, at the timing t34 at which the transistor S5 switches from on to off, the inductor current IL decreases toward 0 (zero), and thereafter remains at 0 (zero).

In this example, because the short circuit has occurred between the terminals T11 and T12, substantially no excitation current IM flows (part (D) of FIG. 6). The charge current ICHG gradually increases in accordance with the inductor current IL in the time period from the timing t33 to the timing t34, and decreases toward 0 (zero) at the timing t34 (part (C) of FIG. 6).

As described above, the charge current ICHG flows in a time period from the timing t31 to the timing t35. However, because the short circuit has occurred between the terminals T11 and T12 in this example, the capacitor 9 is not charged, and accordingly, the voltage VH does not rise.

As illustrated in part (E) of FIG. 4 and part (E) of FIG. 6, a cyclic period corresponding to the switching period Tsw includes a time period during which the inductor current IL is 0 (zero). The inductor current IL increases from 0 (zero) to a peak value Ipeak, and thereafter decreases to 0 (zero) again. As described above, in the precharge operation, the electric power conversion system 1 operates in what is called a discontinuous region. The peak value Ipeak of the inductor current IL when a short circuit has occurred between the terminals T11 and T12 (part (E) of FIG. 6) is greater than the peak value Ipeak of the inductor current IL when no short circuit has occurred between the terminals T11 and T12 (part (E) of FIG. 4). The peak value Ipeak of the inductor current IL when a short circuit has occurred between the terminals T11 and T12 may be represented by the following equation:

$$Ipeak = VL/Lch \times DS \times Tsw \qquad \text{(EQ 1)}$$

where Lch represents an inductance of the choke inductor 16. For the operation of the electric power conversion system 1 in such a discontinuous region, the duty ratio DS is to satisfy the following equation:

$$DS < (Vclmp - VL)/Vclmp \qquad \text{(EQ 2)}$$

where Vclmp represents a clamp voltage of each of the transistors S5 and S6, and the clamp voltage is a break-down voltage when the transistors S5 and S6 operate in an avalanche region, for example.

When the transistors S5 and S6 are operated in the avalanche region, a loss occurs at each of the transistors S5 and S6 in a time period Tav during which the inductor current IL decreases (part (E) of FIG. 6). A loss Ploss at each of the transistors S5 and S6 may be represented by the following equation:

$$Ploss = 1/2 \times Ipeak \times Vclmp \times Tav/Tsw. \quad \text{(EQ 3)}$$

When a short circuit has occurred between the terminals T11 and T12, the peak value Ipeak increases, and the loss Ploss also increases accordingly. Thus, it is necessary to reduce the loss Ploss to prevent malfunctions of the transistors S5 and S6 from being caused by the loss Ploss. As represented by the equation EQ1, the peak value Ipeak is proportional to the duty ratio DS. Therefore, regulating the duty ratio DS, for example, makes it possible to regulate the peak value Ipeak, and to thereby reduce the loss Ploss at each of the transistors S5 and S6. As a result, it is possible to prevent malfunctions of the transistors S5 and S6.

As described above, in the electric power conversion system 1, the control circuit 19 causes the rectifying circuit 14 to operate to supply electric power from the terminals T21 and T22 toward the terminals T11 and T12 in the precharge period P1 before the electric power conversion period P3 during which the electric power is supplied from the terminals T11 and T12 toward the terminals T21 and T22, and performs, in the time period within the precharge period P1, the comparison operation of comparing the voltage between the terminals T11 and T12 detected by the voltage sensor 11 with the threshold TH to thereby detect a short circuit between the terminals T11 and T12. It is therefore possible to effectively detect a short circuit between the terminals T11 and T12.

There may be another method of detecting a short circuit between the terminals T11 and T12 using a current sensor provided on the voltage line L21B of the secondary-side circuitry, for example. However, in general, the current sensor is provided on the voltage line L21B for the purpose of detecting a load current. Thus, to detect the short circuit between the terminals T11 and T12, the current sensor is to be subjected to a circuit change. Further, the current sensor can cause a voltage drop because the load current can flow in a large amount into the voltage line L21B in the electric power conversion operation. Moreover, such provision of the current sensor increases costs. In contrast, in the electric power conversion system 1, the comparison operation of comparing the voltage between the terminals T11 and T12 detected by the voltage sensor 11 with the threshold TH is performed to thereby detect the short circuit between the terminals T11 and T12. This makes it possible to detect the short circuit between the terminals T11 and T12 without providing such a current sensor. Such elimination of the current sensor makes it possible to prevent a voltage drop from being caused by the current sensor and thus to save costs.

Further, in the electric power conversion system 1, each cyclic period corresponding to the switching period Tsw of the rectifying circuit 14 in the precharge period P1 includes the time period during which no current flows through the choke inductor 16. This causes the inductor current IL to increase from 0 (zero). It is therefore possible to regulate the peak value Ipeak by regulating the duty ratio DS, and thus to reduce the loss Ploss at each of the transistors S5 and S6. As a result, it is possible to prevent malfunctions of, for example, the transistors S5 and S6, even when a short circuit has occurred between the terminals T11 and T12.

Further, in the electric power conversion system 1, the control circuit 19 sets the duty ratio DS of each of the transistors S5 and S6 of the rectifying circuit 14 to the value DS1 in the time period from the timing t1 to the timing t4 in FIG. 3, for example, and sets the duty ratio DS of each of the transistors S5 and S6 of the rectifying circuit 14 to the value DS2 that is higher than the value DS1, in the time period from the timing t4 to the timing t5 in FIG. 3, for example. Because the duty ratio DS is regulated to the value DS1 in the time period from the timing t1 to the timing t4 as described above, it is possible to prevent malfunctions of the transistors S5 and S6, for example, even when a short circuit has occurred between the terminals T11 and T12. That is, immediately after the precharge operation starts, whether a short circuit has occurred between the terminals T11 and T12 is not detectable because the voltage VH is sufficiently low, and thus the precharge operation is continued. Thus, if there is a short circuit between the terminals T11 and T12, a loss can result at each of the transistors S5 and S6. In the electric power conversion system 1, the duty ratio DS is regulated to the value DS1 immediately after the precharge operation starts. This makes it possible to reduce the loss Ploss at each of the transistors S5 and S6 even when a short circuit has occurred between the terminals T11 and T12. As a result, it is possible to prevent malfunctions of the transistors S5 and S6 even when a short circuit has occurred between the terminals T11 and T12.

Further, in the electric power conversion system 1, the control circuit 19 performs the comparison operation a plurality of number of times in the time period from the timing t1 to the timing t4 in FIG. 3, for example, and detects a short circuit between the terminals T11 and T12, based on comparison results of the comparison operation performed the plurality of number of times. This makes it possible to prevent erroneous detection. That is, for example, if the control circuit 19 performs the comparison operation just once at the timing t4 and detects a short circuit between the terminals T11 and T12, based on the comparison result, there is a possibility that a desired operation is not performed. For example, the control circuit 19 stops the precharge operation when, despite that the detection voltage VH2 is slightly higher than the threshold TH, it is determined that the detection voltage VH2 is lower than the threshold TH, due to noise. In the electric power conversion system 1, the control circuit 19 performs the comparison operation a plurality of number of times in the time period from the timing t1 to the timing t4, and detects a short circuit between the terminals T11 and T12, based on the comparison results of the comparison operation performed the plurality of number of times. This allows for higher reliability of determination of the control circuit 19 that the detection voltage VH2 is higher than the threshold TH, and thus prevents erroneous detection in detecting a short circuit between the terminals T11 and T12.

Further, in the electric power conversion system 1, the control circuit 19 stops the operations of the switching circuit 12 and the rectifying circuit 14 when the short circuit between the terminal T11 and T12 is detected, as illustrated in FIG. 5, for example. This makes it possible to enhance safety.

[Effects]

According to the present example embodiment, as described above, the control circuit causes the rectifying circuit to operate to supply the electric power from the terminals T21 and T22 toward the terminals T11 and T12 in the precharge period that precedes the electric power conversion period during which the electric power is supplied from the terminals T11 and T12 toward the terminals T21 and T22, and performs, in the time period within the precharge period, the comparison operation of comparing the voltage between the terminals T11 and T12 detected by the voltage sensor 11 with the threshold TH to thereby detect a short circuit between the terminals T11 and T12. It is therefore possible to effectively detect the short circuit between the terminals T11 and T12.

In the present example embodiment, in the precharge period, each cyclic period corresponding to the switching period of the rectifying circuit includes the time period during which no current flows in the choke inductor. It is therefore possible to prevent malfunctions of, for example, the transistors S5 and S6, even when a short circuit has occurred between the terminals T11 and T12.

In the present example embodiment, the control circuit sets the duty ratio DS of each of the transistors S5 and S6 of the rectifying circuit to the value DS1 in the time period from the timing t1 to the timing t4 in FIG. 3, for example, and sets the duty ratio DS of each of the transistors S5 and S6 of the rectifying circuit to the value DS2 that is higher than the value DS1 in the time period from the timing t4 to the timing t5 in FIG. 3, for example. It is therefore possible to prevent malfunctions of, for example, the transistors S5 and S6, even when a short circuit has occurred between the terminals T11 and T12.

In the present example embodiment, the control circuit performs the comparison operation a plurality of number of times in the time period from the timing t1 to the timing t4 in FIG. 3, for example, and detects a short circuit between the terminals T11 and T12, based on the comparison results of the comparison operation performed the plurality of number of times. This makes it possible to prevent erroneous detection.

In the present example embodiment, the control circuit stops the operations of the switching circuit and the rectifying circuit when the short circuit between the terminals T11 and T12 is detected. This makes it possible to enhance safety.

Modification Example 1-1

In the example embodiment described above, the voltage sensor 11 is configured not to operate immediately after the precharge operation starts; however, this is non-limiting. Alternatively, as illustrated in FIGS. 7A and 7B, for example, the voltage sensor 11 may operate based on, for example, a power-supply voltage supplied from another circuit, and may thus be operable even immediately after the precharge operation starts. Specifically, for example, the voltage sensor 11 may be supplied with the power-supply voltage obtained as a result of conversion of the voltage VL performed by an unillustrated isolated electric power conversion apparatus. This allows the voltage sensor 11 to operate immediately after the precharge starts. FIGS. 7A and 7B correspond to FIGS. 3 and 5 of the example embodiment described above, respectively.

In an example of FIG. 7A, no short circuit has occurred between the terminals T11 and T12; therefore, unlike in the cases of the example embodiment described above (FIGS. 3 and 5), the detection voltage VH2 gradually increases from 0 V. That is, the voltage sensor 11 according to the present modification example is operable based on the power-supply voltage supplied from the other circuit even when the voltage VH is sufficiently low. Thus, the detection voltage VH2 is a voltage corresponding to the voltage VH over all of the time periods. The detection voltage VH2 rises higher than the threshold TH by the end of the comparison period PD (part (D) of FIG. 7A). The comparator 26 keeps the disable signal DSBL inactive (at the low level in this example) at and after the timing t4 that is the end timing of the comparison period PD (part (E) of FIG. 7A).

In an example of FIG. 7B, a short circuit has occurred between the terminals T11 and T12; therefore, the detection voltage VH2 is lower than the threshold TH over the entire time period from the timings t21 to the timing t24 (part (D) of FIG. 7B). The comparator 26 sets the disable signal DSBL active (at the high level in this example) at the timing t24 that is the end timing of the comparison period PD (part (E) of FIG. 7B). In such a manner, the control circuit 19 detects the short circuit between the terminals T11 and T12.

Modification Example 1-2

In the example embodiment described above, as illustrated in FIGS. 3 and 5, the comparison period PD starts at the start timing of the precharge period P1; however, this is non-limiting. Alternatively, for example, as illustrated in FIGS. 8A and 8B, the comparison period PD may start at a timing at which a predetermined time has elapsed from the start timing of the precharge period P1. FIGS. 8A and 8B correspond to FIGS. 3 and 5 of the example embodiment described above, respectively.

In an example of FIG. 8A, the comparison period PD starts at a timing t6. In this example, no short circuit has occurred between the terminals T11 and T12; therefore, the detection voltage VH2 rises higher than the threshold TH by the end of the comparison period PD (part (D) of FIG. 8A). The comparator 26 keeps the disable signal DSBL inactive (at the low level in this example) at and after the timing t4 that is the end timing of the comparison period PD (part (E) of FIG. 8A).

In an example of FIG. 8B, the comparison period PD starts at a timing t26. In this example, a short circuit has occurred between the terminals T11 and T12; therefore, the detection voltage VH2 is lower than the threshold TH over the entire time period from the timing t26 to the timing t24 (part (E) of FIG. 8B). The comparator 26 sets the disable signal DSBL active (the high level in this example) at the timing t24 that is the end timing of the comparison period PD (part (E) of FIG. 8B). In such a manner, the control circuit 19 detects a short circuit between the terminals T11 and T12.

Modification Example 1-3

In the example embodiment described above, as illustrated in FIG. 3, the threshold TH is set higher than the voltage to be obtained immediately after the detection voltage VH2 rises at the timing t2; however, this is non-limiting. Alternatively, as illustrated in FIG. 9, for example, the threshold TH may be set lower than the voltage to be obtained immediately after the detection voltage VH2 rises at the timing t2.

Modification Example 1-4

In the example embodiment described above, the comparator 26 sets the disable signal DSBL at the end timing of the comparison period PD; however, this is non-limiting. Alternatively, for example, the comparator 26 may set the disable signal DSBL before the end timing of the comparison period PD. The present modification example will be described in detail below.

Figure 10:
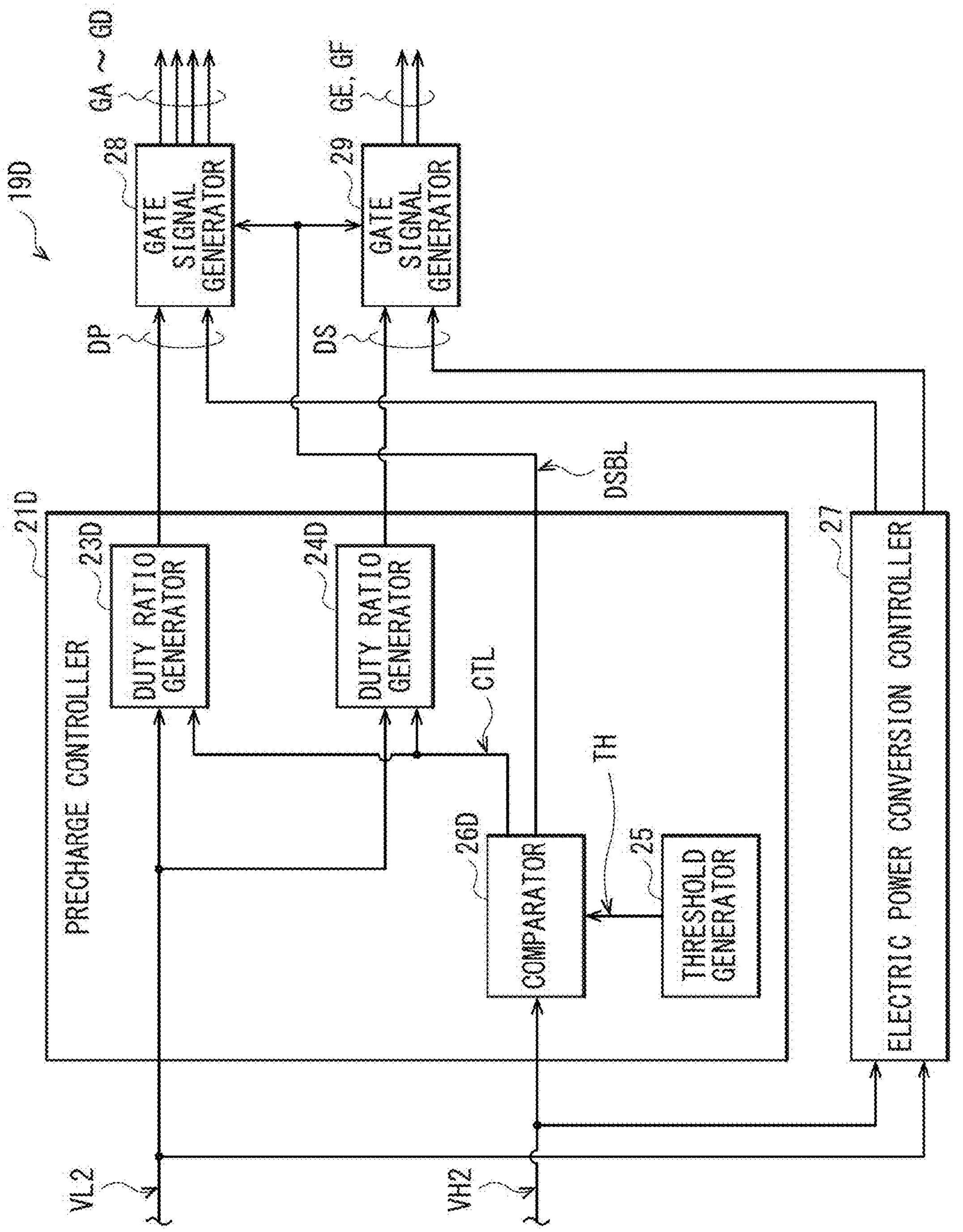
FIG. 10 is a block diagram illustrating a configuration example of a control circuit according to another modification example of the first example embodiment.

FIG. 10 illustrates a specific example of a control circuit 19D according to the present modification example. The control circuit 19D includes a precharge controller 21D. The precharge controller 21D includes duty ratio generators 23D and 24D and a comparator 26D.

Similarly to the duty ratio generator 23 according to the example embodiment described above, the duty ratio generator 23D is configured to generate the duty ratio DP of the switching circuit 12, based on the detection voltage VL2, in the precharge period P1 and the voltage-maintaining period P2. The duty ratio generator 23D starts changing the duty ratio DP, based on a control signal CTL supplied from the comparator 26D, from a timing indicated by the control signal CTL.

Similarly to the duty ratio generator 24 according to the example embodiment described above, the duty ratio generator 24D is configured to generate the duty ratio DS of the rectifying circuit 14, based on the detection voltage VL2, in the precharge period P1 and the voltage-maintaining period P2. The duty ratio generator 24D starts changing the duty ratio DS, based on the control signal CTL supplied from the comparator 26D, from the timing indicated by the control signal CTL.

Similarly to the comparator 26 according to the example embodiment described above, the comparator 26D is configured to generate the disable signal DSBL by comparing the detection voltage VH2 with the threshold TH. Further, the comparator 26D also has a function of generating the control signal CTL that transitions at a timing at which the detection voltage VH2 exceeds the threshold TH.

Figure 11:
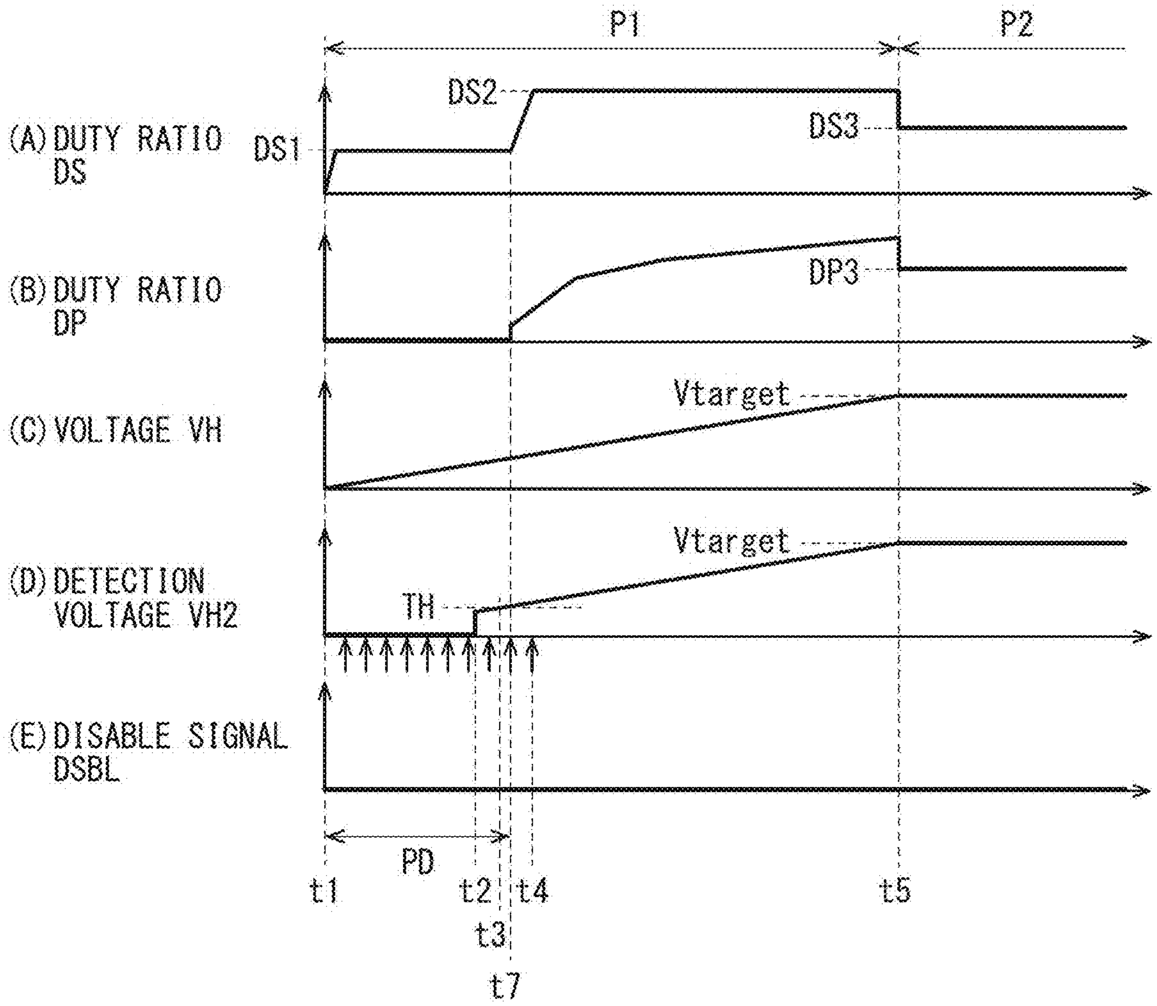
FIG. 11 is a timing diagram illustrating an example operation to be performed by an electric power conversion system including the control circuit illustrated in FIG. 10 in the situation where no short circuit has occurred.

FIG. 11 illustrates an example of the precharge operation to be performed in the situation where no short circuit has occurred between the terminals T11 and T12. FIG. 11 corresponds to FIG. 3 of the example embodiment described above. In this example, the comparator 26D of the precharge controller 21D makes the comparison between the detection voltage VH2 and the threshold TH every time 10 [msec.] elapses, for example, in the time period from the timing t1 to the timing t4 (part (D) of FIG. 11). In this example, the detection voltage VH2 is lower than the threshold TH before the timing t3, and is higher than the threshold TH after the timing t3. That is, the detection voltage VH2 exceeds the threshold TH at a timing t7 that is a comparison timing immediately after the timing t3. The comparator 26D causes the control signal CTL to transition at the timing t7.

The duty ratio generator 24D of the precharge controller 21D starts changing the duty ratio DS, based on the control signal CTL, at the timing t7. Because the disable signal DSBL is inactive, the gate signal generator 29 generates the gate signals GE and GF, based on the duty ratio DS generated by the precharge controller 21D, and the rectifying circuit 14 performs the switching operation, based on these gate signals GE and GF. This causes the duty ratio DS of the switching operation of the rectifying circuit 14 to change from the value DS1 to the value DS2 at and after the timing t7, as illustrated in part (A) of FIG. 11.

Further, the duty ratio generator 23D of the precharge controller 21D starts outputting the duty ratio DP, based on the control signal CTL, at the timing t7. Because the disable signal DSBL is inactive, the gate signal generator 28 generates the gate signals GC and GD, based on the duty ratio DP generated by the precharge controller 21, and maintains the gate signals GA and GB at the low level, and the switching circuit 12 performs the switching operation, based on these gate signals GA to GD. This causes the duty ratio DP of the switching operation of the switching circuit 12 to gradually increase at and after the timing t7, as illustrated in part (B) of FIG. 11.

Here, a time period from the timing t1 to the timing t7 corresponds to a specific example of the "first sub-period" in one embodiment of the disclosure. For example, a time period from the timing t7 to the timing t5 corresponds to a specific example of the "second sub-period" in one embodiment of the disclosure.

As described above, in the electric power conversion system 1 according to the present modification example, at the timing t7 at which it is detected that the detection voltage VH2 is higher than the threshold TH, the duty ratio DS is changed from the value DS1 to the value DS2, and the duty ratio DP is increased. Thus, in this example, the time period from the timing t1 to the timing t7 is the comparison period PD. This allows the precharge operation to be performed in a shorter time.

Modification Example 1-5

In the example embodiment described above, the technology is applied to a center-tapped electric power conversion circuit; however, this is non-limiting. The present modification example will now be described in detail below by way of some examples.

Circuit Example E1

Figure 12:
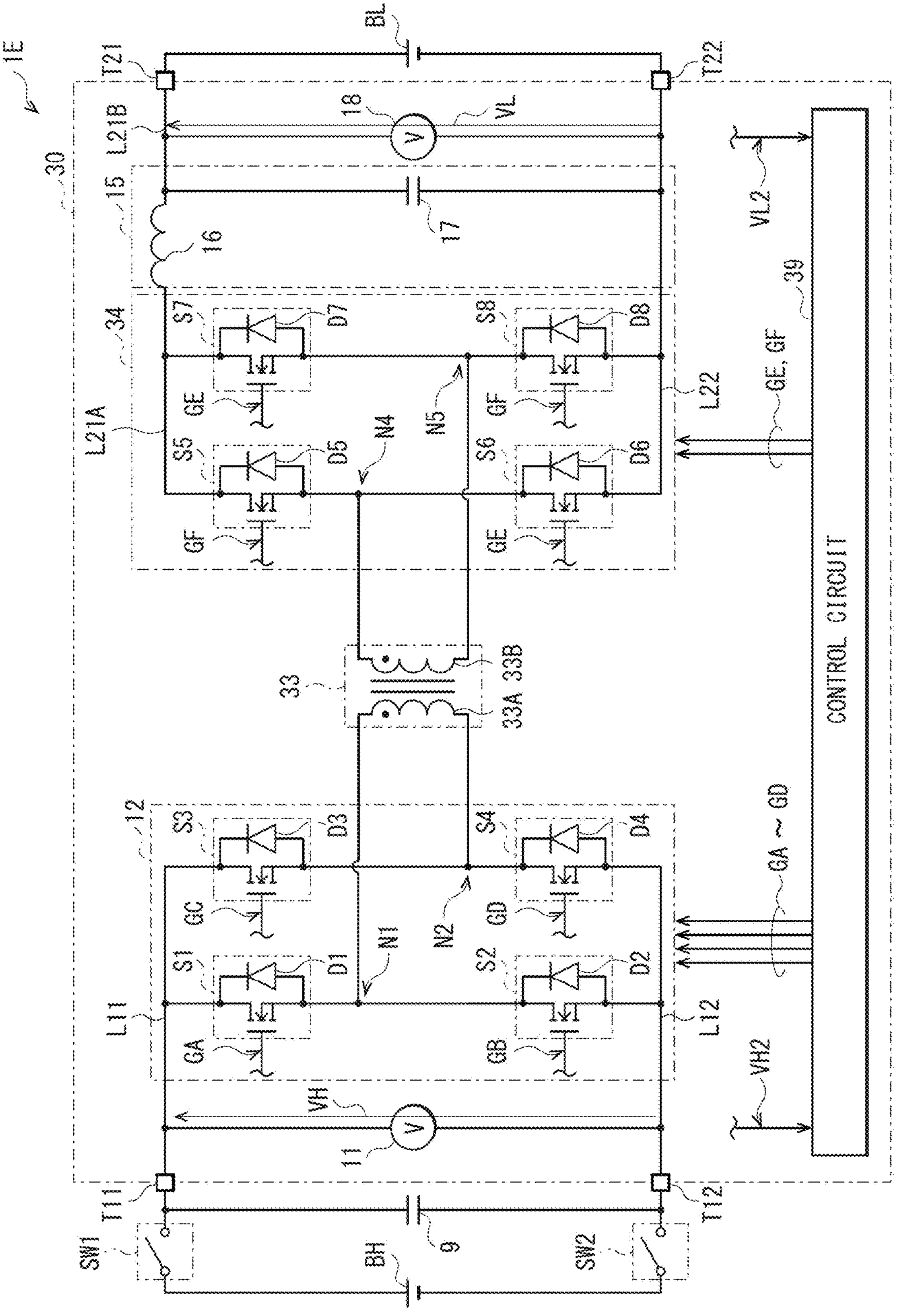
FIG. 12 is a circuit diagram illustrating a configuration example of an electric power conversion system according to another modification example of the first example embodiment.

FIG. 12 illustrates a configuration example of an electric power conversion system 1E according to the present modification example. The electric power conversion system 1E includes an electric power conversion apparatus 30. The electric power conversion apparatus 30 includes a transformer 33, a rectifying circuit 34, and a control circuit 39.

The transformer 33 includes windings 33A and 33B. The winding 33A has one end coupled to the node N1 in the switching circuit 12, and another end coupled to the node N2 in the switching circuit 12. The winding 33B has one end coupled to a node N4 in the rectifying circuit 34, and another end coupled to a node N5 in the rectifying circuit 34.

The rectifying circuit 34 is a full-bridge circuit, and includes transistors S5 to S8. The transistors S5 to S8 each include, for example, an N-type field-effect transistor. The transistors S5 to S8 include body diodes D5 to D8, respectively, as with the transistors S1 to S4. Note that although the N-type field-effect transistor is used in this example, any switching device may be used without limitation. In this example, the transistor including the body diode is used; however, a transistor including no body diode may be used. In such a case, for example, a diode is added instead of the body diode to the transistor. The transistor S5 has the drain coupled to the voltage line L21A, the gate to be supplied with the gate signal GF, and the source coupled to the node N4. The transistor S6 has the drain coupled to the node N4, the gate to be supplied with the gate signal GE, and the source coupled to the reference voltage line L22. The node N4 is a coupling point between the source of the transistor S5 and the drain of the transistor S6. The transistor S7 has a drain coupled to the voltage line L21A, a gate to be supplied with the gate signal GE, and a source coupled to the node N5. The transistor S8 has a drain coupled to the node N5, a gate to be supplied with the gate signal GF, and a source coupled to the reference voltage line L22. The node N5 is a coupling point between the source of the transistor S7 and the drain of the transistor S8.

Similarly to the control circuit 19 according to the example embodiment described above, the control circuit 39 is configured to control an operation of the electric power conversion apparatus 30 by controlling the operation of the switching circuit 12 and an operation of the rectifying circuit 34, based on the voltage VH detected by the voltage sensor 11 and the voltage VL detected by the voltage sensor 18.

Specifically, the control circuit 39 controls the operation of the electric power conversion apparatus 30 by generating the gate signals GA to GF, based on the voltages VH and VL, and performing the PWM control, based on the gate signals GA to GF.

In the electric power conversion system 1E, the control circuit 39 causes the rectifying circuit 34 to operate to supply electric power from the terminals T21 and T22 toward the terminals T11 and T12 in the precharge period P1, and performs, within the time period in the precharge period P1, the comparison operation of comparing the voltage between the terminals T11 and T12 detected by the voltage sensor 11 with the threshold TH to thereby detect a short circuit between the terminals T11 and T12, as in the case of the example embodiment described above.

Circuit Example E2

Figure 13:
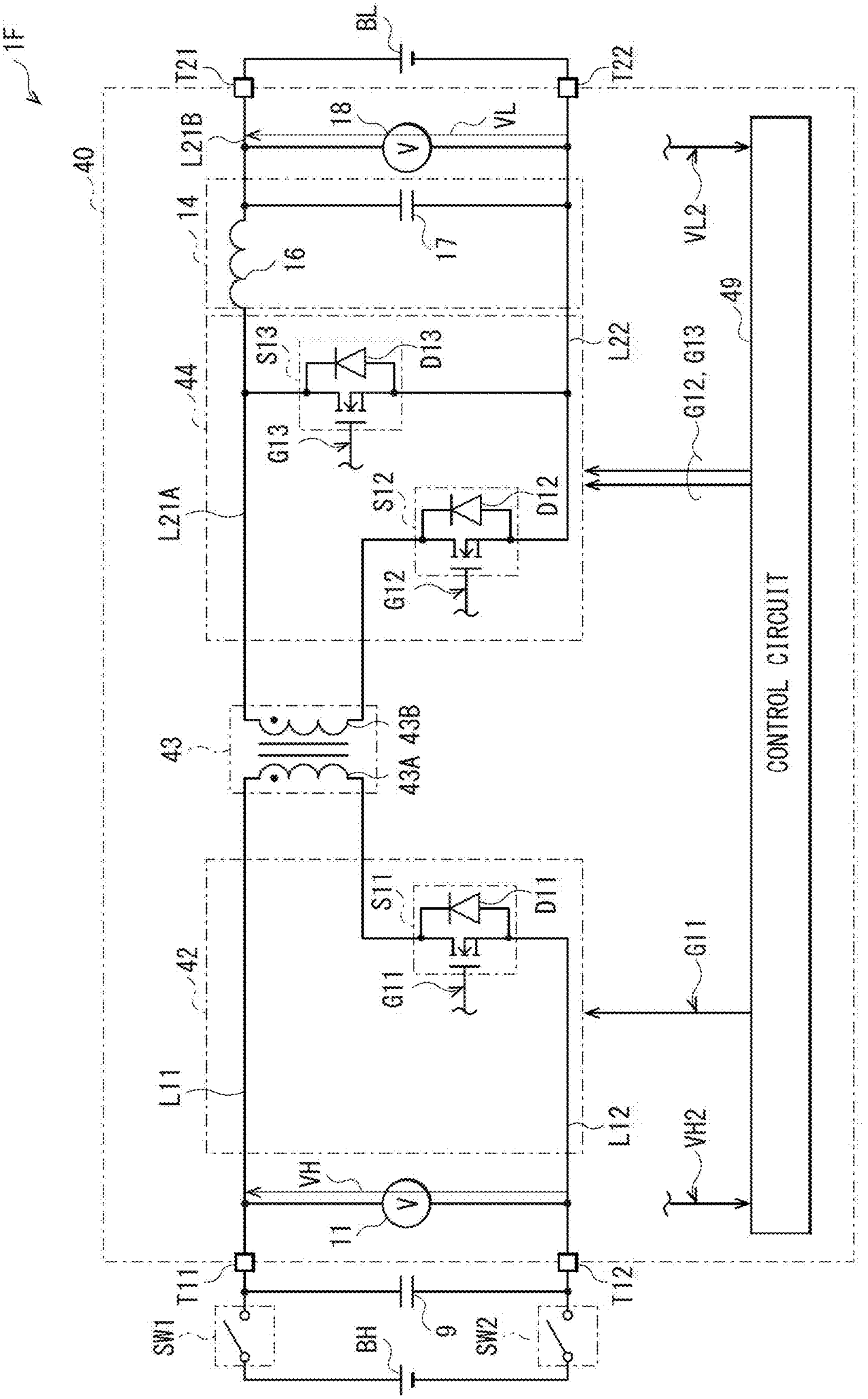
FIG. 13 is a circuit diagram illustrating a configuration example of an electric power conversion system according to another modification example according to the first example embodiment.

FIG. 13 illustrates a configuration example of another electric power conversion system 1F according to the present modification example. The electric power conversion system 1F includes an electric power conversion apparatus 40. The electric power conversion apparatus 40 is what is called a forward converter. The electric power conversion apparatus 40 includes a switching circuit 42, a transformer 43, a rectifying circuit 44, and a control circuit 49.

The switching circuit 42 includes a transistor S11. The transistor S11 is a switching device that performs the switching operation, based on a gate signal G11. The transistor S11 includes a body diode D11, as with the transistors S1 to S4 according to the example embodiment described above. The transistor S11 has a drain coupled to a winding 43A (described later) of the transformer 43, a gate to be supplied with the gate signal G11, and a source coupled to the reference voltage line L12.

The transformer 43 includes the winding 43A and a winding 43B. The winding 43A has one end coupled to the voltage line L11, and another end coupled to the drain of the transistor S11 in the switching circuit 42. The winding 43B has one end coupled to the voltage line L21A, and another end coupled to a drain of a transistor S12 (described later) in the rectifying circuit 44.

The rectifying circuit 44 includes the transistor S12 and a transistor S13. The transistors S12 and S13 each include an N-type field-effect transistor, for example. The transistors S12 and S13 include body diodes D12 and D13, respectively, as with the transistors S1 to S4. Note that although the N-type field-effect transistor is used in this example, any switching device may be used without limitation. In this example, the transistor including the body diode is used; however, a transistor including no body diode may be used. In such a case, for example, a diode is added instead of the body diode to the transistor. The transistor S12 has the drain coupled to the other end of the winding 43B, a gate to be supplied with the gate signal GE, and a source coupled to the reference voltage line L22. The transistor S13 has a drain coupled to the voltage line L21A, a gate to be supplied with the gate signal GF, and a source coupled to the reference voltage line L22.

Similarly to the control circuit 19 according to the example embodiment described above, the control circuit 49 is configured to control an operation of the electric power conversion apparatus 40 by controlling operations of the switching circuit 42 and the rectifying circuit 44, based on the voltage VH (the detection voltage VH2) detected by the voltage sensor 11 and the voltage VL (the detection voltage VL2) detected by the voltage sensor 18. Specifically, the control circuit 49 controls the operation of the electric power conversion apparatus 40 by generating the gate signals G11, G12, and G13, based on the voltages VH and VL, and performing the PWM control, based on the gate signals G11, G12, and G13. For example, in the precharge period P1, the control circuit 49 may generate both the gate signals G12 and G13 or may maintain the gate signal G13 at the low level while generating the gate signal G12. For example, the control circuit 49 may maintain the gate signal G11 at the low level in the precharge period P1. In this case, the body diode D11 of the transistor S11 performs diode rectification.

In the electric power conversion system 1F, the control circuit 49 causes the rectifying circuit 44 to operate to supply electric power from the terminals T21 and T22 toward the terminals T11 and T12 in the precharge period P1, and performs, in the time period within the precharge period P1, the comparison operation of comparing the voltage between the terminals T11 and T12 detected by the voltage sensor 11 with the threshold TH to thereby detect a short circuit between the terminals T11 and T12, as in the case of the example embodiment described above.

As described above, the technology may be applied to various electric power conversion apparatuses.

Other Modification Examples

Further, any two or more of these modification examples may be combined.

2. Second Example Embodiment

A description will be given next of an electric power conversion system 1 according to a second example embodiment. The present example embodiment differs from the first example embodiment described above in the comparison period PD during which the comparison is made between the detection voltage VH2 and the threshold TH. Note that components substantially the same as those in the electric power conversion system 2 according to the first example embodiment described above are denoted by the same reference numerals to omit the description thereof, as appropriate.

Figure 14:
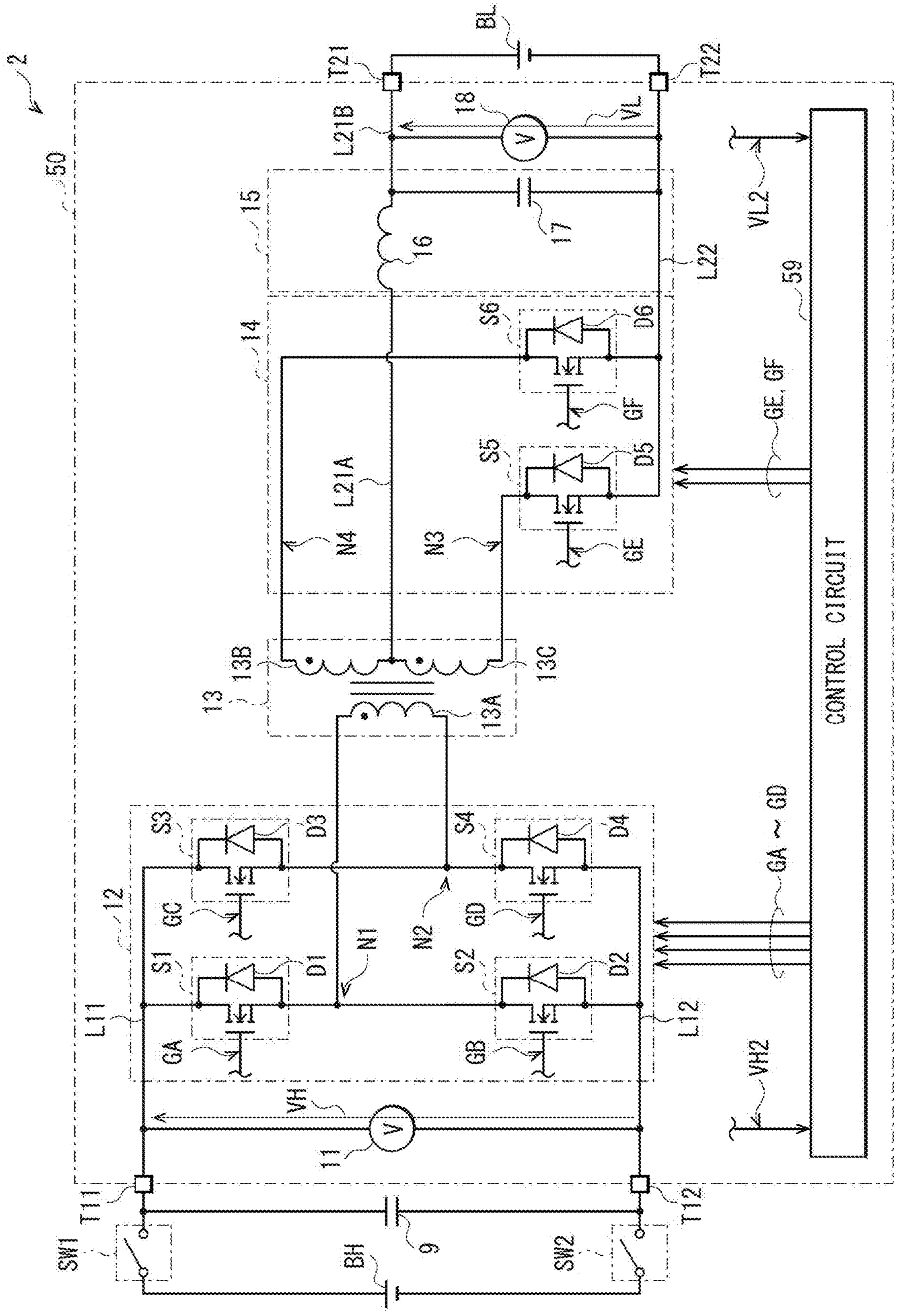
FIG. 14 is a circuit diagram illustrating a configuration example of an electric power conversion system according to a second example embodiment.

FIG. 14 illustrates a configuration example of the electric power conversion system 2. The electric power conversion system 2 includes an electric power conversion apparatus 50. The electric power conversion apparatus 50 includes a control circuit 59. The control circuit 59 is configured to control an operation of the electric power conversion apparatus 50 by controlling the operations of the switching circuit 12 and the rectifying circuit 14, based on the voltage VH (the detection voltage VH2) detected by the voltage sensor 11 and the voltage VL (the detection voltage VL2) detected by the voltage sensor 18.

Figure 15:
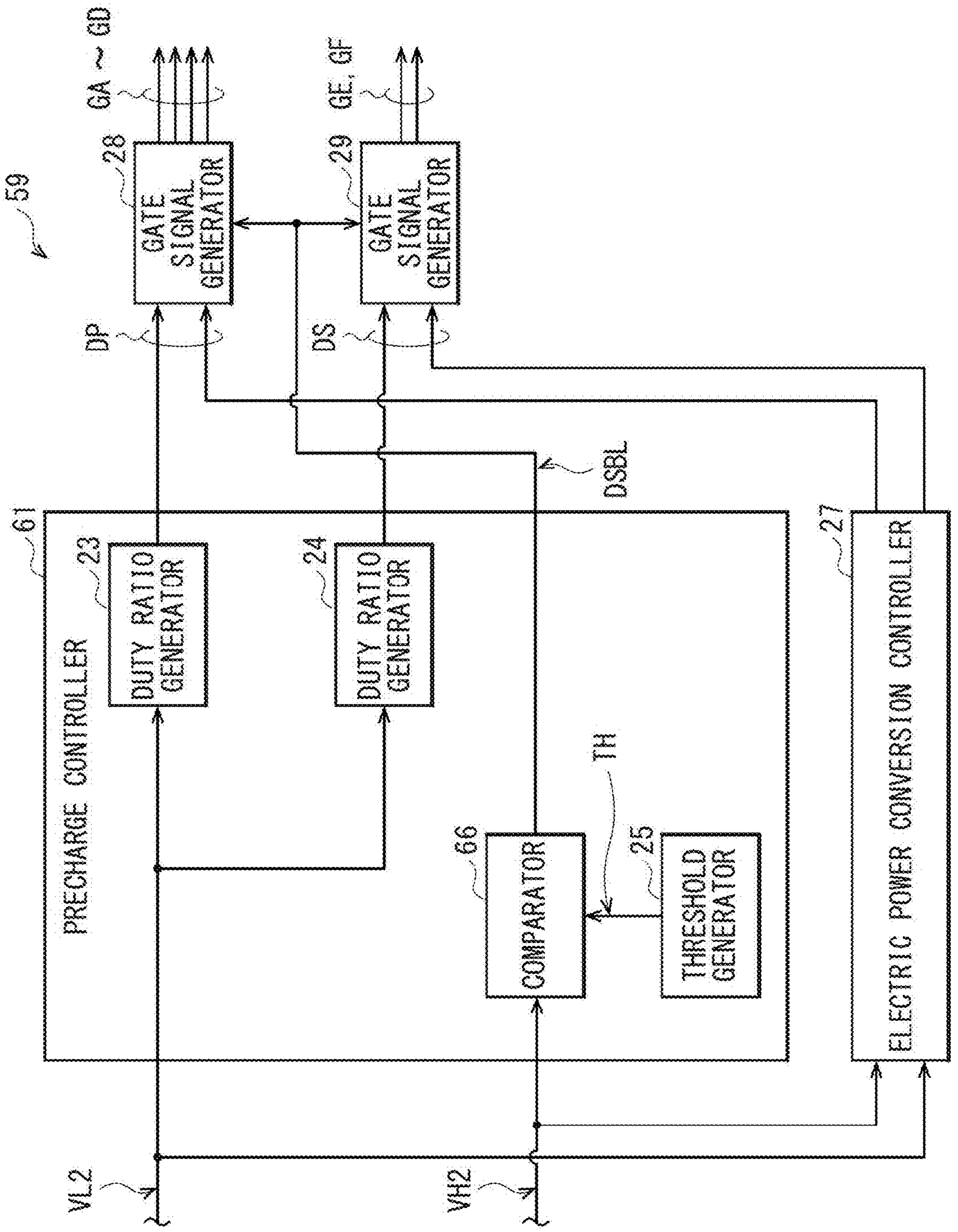
FIG. 15 is a block diagram illustrating a configuration example of a control circuit illustrated in FIG. 14.

FIG. 15 illustrates a configuration example of the control circuit 59. The control circuit 59 includes a precharge controller 61. The precharge controller 61 includes a comparator 66. The comparator 66 is configured to generate the disable signal DSBL by making the comparison between the detection voltage VH2 and the threshold TH. Specifically, the comparator 66 makes the comparison between the detection voltage VH2 and the threshold TH one or more times in a time period (the comparison period PD described later) that is a predetermined time (e.g., 100 [msec.]) after the start of the precharge period P1. Specifically, the comparator 66 compares the detection voltage VH2 with the threshold TH and, when the detection voltage VH2 is higher than the threshold TH, sets the disable signal DSBL inactive (e.g., at the low level). Further, the comparator 66 compares the detection voltage VH2 with the threshold TH and, when the detection voltage VH2 is lower than the threshold TH, sets the disable signal DSBL active (e.g., at the high level) and refrains from performing the comparison operation thereafter.

FIG. 16A illustrates an example of the precharge operation to be performed in the situation where no short circuit has occurred between the terminals T11 and T12. In FIG. 16A, part (A) indicates the duty ratio DS of the switching operation of the rectifying circuit 14, part (B) indicates the duty ratio DP of the switching operation of the switching circuit 12, part (C) indicates the waveform of the voltage VH, part (D) indicates the waveform of the result of detection by the voltage sensor 11, that is, the detection voltage VH2, and part (E) indicates the waveform of the disable signal DSBL.

First, in a time period from a timing t51 to a timing t54, the duty ratio generator 24 of the precharge controller 61 sets the duty ratio DS to the value DS1 (part (A) of FIG. 16A). The time period from the timing t51 to the timing t54 has a time length of, for example, 100 [msec.], and the timing t54 is set based on a timer of the control circuit 59, for example. The gate signal generator 29 generates the gate signals GE and GF, based on the duty ratio DS generated by the precharge controller 61, and the rectifying circuit 14 performs the switching operation, based on the gate signals GE and GF. Further, in the time period from the timing t51 to the timing t54, the duty ratio generator 23 sets the duty ratio DP to "0" (zero) (part (B) of FIG. 16A). The gate signal generator 28 maintains the gate signals GA to GD at the low level, based on the duty ratio DP generated by the precharge controller 61, and the switching circuit 12 keeps the transistors S1 to S4 off, based on the gate signals GA to GD. In such a manner, the rectifying circuit 14 performs the switching operation, and as a result, the voltage VH at the capacitor 9 gradually rises (part (C) of FIG. 16A).

During a time period from the timing t51 to the timing t52, the detection voltage VH2 is 0 V (part (D) of FIG. 16A). At the timing t52, the voltage VH reaches a voltage high enough to allow the voltage sensor 11 to operate, and the voltage sensor 11 starts operating at the timing t52. This causes the detection voltage VH2 to reach a voltage corresponding to the voltage VH at and after the timing t52.

In a time period from a timing t54 to the start of the electric power conversion operation (the comparison period PD), the comparator 66 of the precharge controller 61 makes the comparison between the detection voltage VH2 and the threshold TH every time 10 [msec.] elapses, for example (part (D) of FIG. 16A). In part (D) of FIG. 16A, arrows indicate comparison timings at which the comparator 66 makes the comparison. In this example, the detection voltage VH2 exceeds the threshold TH at a timing t53 because no short circuit has occurred between the terminals T11 and T12. For example, at the timing t54, the detection voltage VH2 is higher than the threshold TH, and therefore the comparator 66 sets the disable signal DSBL inactive (at the low level in this example). The comparator 66 sets the disable signal DSBL every time the comparison is made between the detection voltage VH2 and the threshold TH. In this example, the detection voltage VH2 is higher than the threshold TH over the entire comparison period PD from the timing t54. Thus, the comparator 66 keeps the disable signal DSBL inactive (at the low level in this example) during the comparison period PD (part (E) of FIG. 16A).

In a time period from the timing t54 to a timing t55, the duty ratio generator 24 of the precharge controller 61 sets the duty ratio DS to the value DS2 that is higher than the value DS1 (part (A) of FIG. 16A). Because the disable signal DSBL is inactive, the gate signal generator 29 generates the gate signals GE and GF, based on the duty ratio DS generated by the precharge controller 61, and the rectifying circuit 14 performs the switching operation, based on the gate signals GE and GF. This causes the duty ratio DS of the switching operation of the rectifying circuit 14 to change from the value DS1 to the value DS2, as illustrated in part (A) of FIG. 16A. Further, in the time period from the timing t54 to the timing t55, the duty ratio generator 24 of the precharge controller 61 so generates the duty ratio DP that the duty ratio DP gradually increases (part (B) of FIG. 16A). Because the disable signal DSBL is inactive, the gate signal generator 28 generates the gate signals GC and GD, based on the duty ratio DP generated by the precharge controller 61, and maintains the gate signals GA and GB at the low level, and the switching circuit 12 performs the switching operation, based on the gate signals GA to GD. This causes the duty ratio DP of the switching operation of the switching circuit 12 to gradually increase in the time period from the timing t54 to the timing t55, as illustrated in part (B) of FIG. 16A. In such a manner, the switching circuit 12 and the rectifying circuit 14 perform the switching operations, and as a result, the voltage VH at the capacitor 9 gradually rises (part (C) of FIG. 16A).

When the detection voltage VH2 reaches the target voltage Vtarget at the timing t55, the electric power conversion system 2 performs the voltage-maintaining operation of maintaining the voltage VH at or near the target voltage Vtarget in a time period from the timing t55 (the voltage-maintaining period P2). This operation is similar to that in the first example embodiment described above. The comparator 66 of the precharge controller 61 subsequently repeats the comparison operation also in the voltage-maintaining period P2. In this example, because no short circuit has occurred between the terminals T11 and T12, the comparator 66 keeps the disable signal DSBL inactive (at the low level in this example) (part (E) of FIG. 16A).

Here, for example, the time period from the timing t51 to the timing t54 corresponds to a specific example of the "first sub-period" in one embodiment of the disclosure. The time period from the timing t54 to the timing t55 corresponds to a specific example of the "second sub-period" in one embodiment of the disclosure.

Operation waveforms in the time period from the timing t51 to the timing t54 are similar to those in the first example embodiment described above (FIG. 4).

FIG. 16B illustrates an example of the precharge operation to be performed in the situation where a short circuit has already occurred between the terminals T11 and T12. Timings t61 and t64 correspond to the timings t51 and t54 in the example of FIG. 16A, respectively.

In a time period from the timing t61 to the timing t64, the electric power conversion system 2 sets the duty ratio DS to the value DS1, and sets the duty ratio DP to "0" (zero) (parts (A) and (B) of FIG. 16B), as in the time period from the timing t51 to the timing t54 illustrated in FIG. 16A. In this example, because the short circuit has occurred between the terminals T11 and T12, the voltage VH at the capacitor 9 does not rise and thus remains at 0 V (part (C) of FIG. 16B). Because the voltage VH remains at OV, the voltage sensor 11 is not operable, and the detection voltage VH2 also remains at 0 V (part (D) of FIG. 16B).

At the timing t64, the comparator 66 of the precharge controller 61 makes the comparison between the detection voltage VH2 and the threshold TH (part (D) of FIG. 16B).

In this example, because the short circuit has occurred between the terminals T11 and T12, the detection voltage VH2 is lower than the threshold TH. Thus, the comparator 66 sets the disable signal DSBL active (at the high level in this example). In such a manner, the control circuit 59 detects the short circuit between the terminals T11 and T12. The comparator 66 refrains from performing the comparison operation thereafter.

Because the disable signal DSBL is active, the gate signal generator 29 generates the gate signals GE and GF to be maintained at the low level, regardless of the duty ratio DS generated by the precharge controller 61, and the rectifying circuit 14 stops the switching operation, based on the gate signals GE and GF. This causes the duty ratio DS of the switching operation of the rectifying circuit 14 to become 0 (zero), as illustrated in part (A) of FIG. 16B. Similarly, because the disable signal DSBL is active, the gate signal generator 28 generates the gate signals GA to GD to be maintained at the low level, regardless of the duty ratio DP generated by the precharge controller 61, and the switching circuit 12 stops the switching operation, based on the gate signals GA to GD. This causes the duty ratio DP of the switching operation of the switching circuit 12 to become 0 (zero), as illustrated in part (B) of FIG. 16B. In such a manner, the electric power conversion system 2 temporarily stops the precharge operation.

Thereafter, upon the lapse of the predetermined time, for example, the electric power conversion system 2 restarts the precharge operation and checks whether the short circuit is present between the terminals T11 and T12. For example, the electric power conversion system 2 starts performing the precharge operation a plurality of number of times, and completely stops the operation if the short circuit is still present between the terminals T11 and T12. Further, the electric power conversion system 2 issues the notification indicating the occurrence of short circuit between the terminals T11 and T12 to an external device, for example.

Operation waveforms in the time period from the timing t61 to the timing t64 are similar to those in the first example embodiment described above (FIG. 6).

FIG. 16C illustrates an example of the precharge operation to be performed in a situation where a short circuit occurs between the terminals T11 and T12 in the middle of the precharge operation. Timings t71 to t74 correspond to the timings t51 to t54 in the example of FIG. 16A, respectively. In this example, a short circuit occurs between the terminals T11 and T12 at a timing t75.

In a time period from the timing t71 to the timing t74, the electric power conversion system 2 sets the duty ratio DS to the value DS1, and sets the duty ratio DP to “0” (zero) (parts (A) and (B) of FIG. 16C), as in the time period from the timing t51 to the timing t54 illustrated in FIG. 16A. In this example, no short circuit has occurred yet between the terminals T11 and T12 in the time period from the timing t71 to the timing t74; therefore, the voltage VH at the capacitor 9 rises as a result of the precharge operation (part (C) of FIG. 16C). At the timing t72, the voltage VH reaches a voltage high enough to allow the voltage sensor 11 to operate, and the voltage sensor 11 starts operating at the timing t72. This causes the detection voltage VH2 to reach a voltage corresponding to the voltage VH at and after the timing t72 (part (D) of FIG. 16C).

In the comparison period PD starting from the timing t74, the comparator 66 of the precharge controller 61 makes the comparison between the detection voltage VH2 and the threshold TH every time 10 [msec.] elapses, for example (part (D) of FIG. 16C). For example, at the timing t74, the detection voltage VH2 is higher than the threshold TH, and therefore the comparator 66 sets the disable signal DSBL inactive (at the low level in this example). The comparator 66 sets the disable signal DSBL every time the comparison is made between the voltage VH and the threshold TH. In this example, the detection voltage VH2 is higher than the threshold TH during a time period from the timing t74 to the timing t75. Thus, the comparator 66 keeps the disable signal DSBL inactive (at the low level in this example) during the time period from the timing t74 to the timing t75 (part (E) of FIG. 15C).

In a time period from the timing t74 to a timing t76, because the disable signal DSBL is inactive, the electric power conversion system 2 sets the duty ratio DS to the value DS2 and gradually increases the duty ratio DP (parts (A) and (B) of FIG. 16C), as in the case of FIG. 16A.

In this example, at the timing t75, a short circuit occurs between the terminals T11 and T12, and the voltage VH becomes 0 V (part (C) of FIG. 16C). Accordingly, the detection voltage VH2 also becomes 0 V, and the detection voltage VH2 falls below the threshold TH (part (D) of FIG. 16C). Thus, at the timing t76 that is a timing of a subsequent comparison, the detection voltage VH2 is lower than the threshold TH, and therefore the comparator 66 sets the disable signal DSBL active (at the high level in this example) (part (E) of FIG. 16C). In such a manner, the control circuit 59 detects the short circuit between the terminals T11 and T12. The comparator 66 refrains from performing the comparison operation thereafter. The comparison period PD thus ends at the timing t76.

In a time period from the timing t76, because the disable signal DSBL is active, the gate signal generator 29 generates the gate signals GE and GF to be maintained at the low level, regardless of the duty ratio DS generated by the precharge controller 61, and the rectifying circuit 14 stops the switching operation, based on the gate signals GE and GF. This causes the duty ratio DS of the switching operation of the rectifying circuit 14 to become 0 (zero), as illustrated in part (A) of FIG. 16C. Similarly, because the disable signal DSBL is active, the gate signal generator 28 generates the gate signals GA to GD to be maintained at the low level, regardless of the duty ratio DP generated by the precharge controller 61, and the switching circuit 12 stops the switching operation, based on the gate signals GA to GD. This causes the duty ratio DP of the switching operation of the switching circuit 12 to become 0 (zero), as illustrated in part (B) of FIG. 16C. In such a manner, the electric power conversion system 2 temporarily stops the precharge operation.

Thereafter, upon the lapse of the predetermined time, for example, the electric power conversion system 2 restarts the precharge operation and checks whether the short circuit is present between the terminals T11 and T12. For example, the electric power conversion system 2 starts performing the precharge operation a plurality of number of times, and completely stops the operation if the short circuit is still present between the terminals T11 and T12. Further, the electric power conversion system 2 issues the notification indicating the occurrence of short circuit between the terminals T11 and T12 to an external device, for example.

As described above, in the electric power conversion system 2, the control circuit 59 performs the comparison operation a plurality of number of times in the time period from the timing t54 to the timing t55 in FIG. 16A, for example, and detects a short circuit between the terminals T11 and T12, based on each of the comparison results of the comparison operation performed the plurality of number of times. This makes it possible to detect a short circuit between the terminals T11 and T12 even when the short circuit has occurred between the terminals T11 and T12 in the middle of the precharge operation, as illustrated in FIG. 16C, for example. It is therefore possible to effectively detect a short circuit between the terminals T11 and T12.

In the present example embodiment, as described above, the control circuit performs the comparison operation a plurality of number of times in the time period from the timing t54 to the timing t55 in FIG. 16A, for example, and detects a short circuit between the terminals T11 and T12, based on the comparison results of the comparison operation performed the plurality of number of times. It is therefore possible to effectively detect the short circuit between the terminals T11 and T12. Other effects are similar to those of the first example embodiment described above.

Modification Example 2-1

In the example embodiment described above, the voltage sensor 11 is configured not to operate immediately after the precharge operation starts; however, this is non-limiting. Alternatively, as illustrated in FIGS. 17A to 17C, for example, the voltage sensor 11 may operate based on, for example, the power-supply voltage supplied from another circuit, and may thus be operable even immediately after the precharge operation starts. FIGS. 17A to 17C correspond to FIGS. 16A to 16C of the example embodiment described above, respectively. In the present modification example, the detection voltage VH2 gradually rises from 0 V, unlike in the case of the example embodiment described above (FIGS. 16A to 16C). That is, the voltage sensor 11 according to the present modification example is configured to operate based on the power-supply voltage supplied from the other circuit, even when the voltage VH is sufficiently low. Thus, the detection voltage VH2 is a voltage corresponding to the voltage VH over all the time periods. In this case also, the electric power conversion system 2 is configured to detect a short circuit between the terminals T11 and T12.

Modification Example 2-2

In the example embodiment described above, as illustrated in FIGS. 16B and 16C, the comparator 66 makes the comparison between the detection voltage VH2 and the threshold TH, and sets the disable signal DSBL active (e.g., at the high level) upon detecting once that the detection voltage VH2 is lower than the threshold VTH; however, this is non-limiting. Alternatively, as illustrated in FIGS. 18A and 18B, for example, the comparator 66 may set the disable signal DSBL active (e.g., at the high level) upon detecting a predetermined number of times (three times in this example) in succession that the detection voltage VH2 is lower than the threshold VTH. FIGS. 18A and 18B correspond to FIGS. 16B and 16C of the example embodiment described above, respectively.

In the example of FIG. 18A, a short circuit has occurred between the terminals T11 and T12; therefore, the comparator 66 detects that the detection voltage VH2 is lower than the threshold TH at three comparison timings in a time period from the timing t64 to a timing t66. In this example, the comparator 66 detects that the detection voltage VH2 is lower than the threshold TH three times in succession; therefore, the comparator 66 sets the disable signal DSBL active (e.g., at the high level) at the timing t66 that is the third comparison timing. In such a manner, the control circuit 59 detects the short circuit between the terminals T11 and T12.

In the example of FIG. 18B, a short circuit occurs between the terminals T11 and T12 at the timing t75; therefore, the comparator 66 detects that the detection voltage VH2 is lower than the threshold TH at three comparison timings in a time period from the timing t76 to a timing t77. In this example, the comparator 66 detects that the detection voltage VH2 is lower than the threshold TH three times in succession; therefore, the comparator 66 sets the disable signal DSBL active (e.g., at the high level) at the timing t77 that is the third comparison timing. In such a manner, the control circuit 59 detects the short circuit between the terminals T11 and T12.

In this example, the comparator 66 sets the disable signal DSBL active (e.g., at the high level) upon detecting three times in succession that the detection voltage VH2 is lower than the threshold VTH; however, this is non-limiting. Alternatively, for example, the comparator 66 may set the disable signal DSBL active upon detecting two times in succession that the detection voltage VH2 is lower than the threshold VTH, or may set the disable signal DSBL active upon detecting four or more times in succession that the detection voltage VH2 is lower than the threshold VTH.

Modification Example 2-3

In the example embodiment described above, as illustrated in FIGS. 16A to 16C, the comparator 66 performs the comparison operation one or more times; however, this is non-limiting. Alternatively, as illustrated in FIGS. 19A and 19B, for example, the comparator 66 may perform the comparison operation only once. FIGS. 19A and 19B correspond to FIGS. 16A and 16B of the example embodiment described above, respectively.

In the example of FIG. 19A, the comparator 66 makes the comparison between the detection voltage VH2 and the threshold TH at the timing t54. In this example, no short circuit has occurred between the terminals T11 and T12; therefore, the detection voltage VH2 is higher than the threshold TH. Thus, the comparator 66 keeps the disable signal DSBL inactive (at the low level in this example) at and after the timing t54 (part (E) of FIG. 19A).

In the example of FIG. 19B, the comparator 66 makes the comparison between the detection voltage VH2 and the threshold TH at the timing t64. In this example, a short circuit has occurred between the terminals T11 and T12; therefore, the detection voltage VH2 is lower than the threshold TH. Thus, the comparator 66 sets the disable signal DSBL active (at the high level in this example) at the timing t64 (part (E) pf FIG. 19B). [Other Modification Examples]

Further, any two or more of these modification examples may be combined.

The disclosure has been described hereinabove with reference to the example embodiments and the modification examples. However, the disclosure is not limited to the example embodiments and the like and may be modified in a variety of ways.

For example, in the first example embodiment described above, as illustrated in part (A) of FIG. 3, the duty ratio generator 24 of the precharge controller 21 sets the duty ratio DS to the value DS1 in the time period from the timing t1 to the timing t4, and sets the duty ratio DS to the value DS2 that is higher than the value DS1 in the time period from the timing t4 to the timing t5. In setting the duty ratio DS to the value DS1 in the time period from the timing t1 to the timing t4, the duty ratio generator 24 may gradually increase the duty ratio DS in such a manner that the duty ratio DS eventually reaches the value DS1, as illustrated in FIG. 20, for example. Similarly, in setting the duty ratio DS to the value DS2 in the time period from the timing t4 to the timing t5, the duty ratio generator 24 may gradually increase the duty ratio DS in such a manner that the duty ratio DS eventually reaches the value DS2, as illustrated in FIG. 20, for example. This similarly applies to the second example embodiment described above.

For example, in the first example embodiment described above, as illustrated in part (D) of FIG. 3, the comparator 26 makes the comparison between the detection voltage VH2 and the threshold TH at discrete timings; however, this is non-limiting. Alternatively, for example, the comparator may be analog circuitry, and may make the comparison between the detection voltage VH2 and the threshold TH in succession in the comparison period PD. If the detection voltage VH2 is constantly lower than the threshold TH in the comparison period PD, the comparator determines that a short circuit has occurred between the terminals T11 and T12 due to some factors and sets the disable signal DSBL active. Further, if the detection voltage VH2 becomes higher than the threshold TH by the end of the comparison period PD, the comparator sets the disable signal DSBL inactive (e.g., at the low level) at the end timing of the comparison period PD. This similarly applies to the second example embodiment described above.

For example, in the example embodiments described above, the step-down operation is performed in the electric power conversion operation; however, this is non-limiting, and a step-up operation may be performed.

For example, in the example embodiments described above, a unidirectional conversion operation of supplying electric power from the high voltage battery BH to the low voltage battery BL is performed in the electric power conversion operation; however, this is non-limiting. For example, a bidirectional conversion operation may be performed in the electric power conversion operation by providing a mode in which electric power is supplied from the high voltage battery BH to the low voltage battery BL and a mode in which electric power is supplied from the low voltage battery BL to the high voltage battery BH. In this case also, the capacitor 9 may be charged with the electric power supplied from the low voltage battery BL in the preparation period that precedes the electric power conversion operation is performed in the mode in which the electric power is supplied from the high voltage battery BH to the low voltage battery BL.

For example, in the example embodiments described above, the short circuit between the terminals T11 and T12 is detected based on the result of detection by the voltage sensor 11; however, this is non-limiting. The short circuit between the terminals T11 and T12 may also be detected based on a result of detection by another sensor such as a current sensor. In a case of using the current sensor, the current sensor may be disposed on the voltage line L21B or the voltage line L11, for example. According to the technology, the electric power conversion system may be configured to stop the precharge operation when a short circuit between the terminals T11 and T12 is detected based on the result of detection by the voltage sensor 11 and is also detected based on the result of detection by the current sensor.

For example, the circuit configuration of the switching circuit, the circuit configuration of the rectifying circuit, and the operation waveform of the gate signal in the example embodiments and the like described above are mere examples and may be modified as appropriate.

Embodiments of the disclosure may be configured as follows.

(1)

An electric power conversion apparatus including:

a first electric power terminal including two coupling terminals;

a voltage sensor configured to detect a voltage between the two coupling terminals of the first electric power terminal;

a switching circuit coupled to the first electric power terminal and including one or more switching devices;

a transformer including a first winding and a second winding, the first winding being coupled to the switching circuit;

a rectifying circuit coupled to the second winding and including one or more switching devices;

a smoothing circuit coupled to the rectifying circuit and including an inductor and a first capacitor;

a second electric power terminal coupled to the smoothing circuit; and a control circuit configured to control operations of the switching circuit and the rectifying circuit, in which the control circuit is configured to cause the rectifying circuit to operate to supply electric power from the second electric power terminal toward the first electric power terminal in a second period that precedes a first period during which electric power is supplied from the first electric power terminal toward the second electric power terminal, and is configured to detect a short circuit between the two coupling terminals by performing, in the second period, a comparison operation of comparing the voltage detected by the voltage sensor with a predetermined threshold voltage.

(2)

The electric power conversion apparatus according to (1), in which, in the second period, each cyclic period corresponding to a switching period of the rectifying circuit includes a time period during which no current flows through the inductor.

(3)

The electric power conversion apparatus according to (1) or (2), in which the second period is configured to include a first sub-period and a second sub-period subsequent to the first sub-period, and the control circuit is configured to set a duty ratio of the one or more switching devices of the rectifying circuit to a first duty ratio in the first sub-period, and set the duty ratio of the one or more switching devices of the rectifying circuit to a second duty ratio greater than the first duty ratio in the second sub-period.

(4)

The electric power conversion apparatus according to (3), in which the control circuit is configured to perform the comparison operation a plurality of number of times in the first sub-period, and detect the short circuit between the two coupling terminals, based on comparison results of the comparison operation performed the plurality of number of times.

(5)

The electric power conversion apparatus according to (4), in which the first sub-period is a time period of a predetermined length, and the control circuit is configured to, when all the comparison results of the comparison operation performed the plurality of number of times in the first sub-period indicate that the voltage detected by the voltage sensor is lower than the threshold voltage, determine that the short circuit has occurred between the two coupling terminals.

(6)

The electric power conversion apparatus according to (4), in which the first sub-period is a time period of a predetermined length, and the control circuit is configured to start the second sub-period when one or more of the comparison results of the comparison operation performed the plurality of number of times in the first sub-period indicate that the voltage detected by the voltage sensor is higher than the threshold voltage.

(7)

The electric power conversion apparatus according to (4), in which the control circuit is configured to start the second sub-period when a latest one of the comparison results of the comparison operation performed the plurality of number of times in the first sub-period indicates that the voltage detected by the voltage sensor is higher than the threshold voltage.

(8)

The electric power conversion apparatus according to (3), in which the control circuit is configured to perform the comparison operation one or more times in the second sub-period, and detect the short circuit of the first electric power terminal, based on comparison results of the comparison operation performed one or more times.

(9)

The electric power conversion apparatus according to (8), in which the control circuit is configured to, when a latest one of the comparison results of the comparison operation performed one or more times in the second sub-period indicates that the voltage detected by the voltage sensor is lower than the threshold voltage, determine that the short circuit has occurred between the two coupling terminals.

(10)

The electric power conversion apparatus according to (8), in which the control circuit is configured to perform the comparison operation a plurality of number of times in the second sub-period, and to, when comparison results of the comparison operation performed latest two or more predetermined number of times, out of the plurality of number of times, all indicate that the voltage detected by the voltage sensor is lower than the threshold voltage, determine that the short circuit has occurred between the two coupling terminals.

(11)

The electric power conversion apparatus according to (8), in which the control circuit is configured to perform the comparison operation once in the second sub-period, and detect the short circuit between the two coupling terminals, based on a comparison result of the comparison operation.

(12)

The electric power conversion apparatus according to (3), in which the voltage sensor is configured to stop operating in a part of the first sub-period, and operate in a part of the first sub-period and the second sub-period.

(13)

The electric power conversion apparatus according to (1) or (2), in which the control circuit is configured to stop the operations of the switching circuit and the rectifying circuit when the short circuit of the first electric power terminal is detected.

(14)

An electric power conversion system including:

a first battery including a first terminal and a second terminal;

a second capacitor including a first terminal and a second terminal;

a first switch provided on a path coupling the first terminal of the first battery and the first terminal of the second capacitor to each other;

a second switch provided on a path coupling the second terminal of the first battery and the second terminal of the second capacitor to each other;

an electric power conversion apparatus; and a second battery, the electric power conversion apparatus including

- a first electric power terminal including a first coupling terminal and a second coupling terminal, the first coupling terminal being coupled to the first terminal of the second capacitor, the second coupling terminal being coupled to the second terminal of the second capacitor,
- a voltage sensor configured to detect a voltage between the first coupling terminal and the second coupling terminal,
- a switching circuit coupled to the first electric power terminal and including one or more switching devices,
- a transformer including a first winding and a second winding, the first winding being coupled to the switching circuit,
- a rectifying circuit coupled to the second winding and including one or more switching devices,
- a smoothing circuit coupled to the rectifying circuit and including an inductor and a first capacitor,
- a second electric power terminal coupled to the smoothing circuit and the second battery, and
- a control circuit configured to control operations of the switching circuit and the rectifying circuit, in which the control circuit is configured to cause the rectifying circuit to operate to supply electric power from the second electric power terminal to the first electric power terminal in a second period that precedes a first period during which electric power is supplied from the first electric power terminal toward the second electric power terminal, and is configured to detect a short circuit between the first coupling terminal and the second coupling terminal by performing, in the second period, a comparison operation of comparing the voltage detected by the voltage sensor with a predetermined threshold voltage.

The electric power conversion apparatus and the electric power conversion system according to the respective example embodiments of the disclosure each make it possible to effectively detect a short circuit occurring at the input terminal on the primary side.

The invention claimed is:

1. An electric power conversion apparatus comprising:

a first electric power terminal including two coupling terminals;

a voltage sensor configured to detect a voltage between the two coupling terminals of the first electric power terminal;

a switching circuit coupled to the first electric power terminal and including one or more switching devices;

a transformer including a first winding and a second winding, the first winding being coupled to the switching circuit;

a rectifying circuit coupled to the second winding and including one or more switching devices;

a smoothing circuit coupled to the rectifying circuit and including an inductor and a first capacitor;

a second electric power terminal coupled to the smoothing circuit; and a control circuit configured to control operations of the switching circuit and the rectifying circuit, wherein the control circuit is configured to cause the rectifying circuit to operate to supply electric power from the second electric power terminal toward the first electric power terminal in a second period that precedes a first period during which electric power is supplied from the first electric power terminal toward the second electric power terminal, and is configured to detect a short circuit between the two coupling terminals by performing, in the second period, a comparison operation of comparing the voltage detected by the voltage sensor with a predetermined threshold voltage.

2. The electric power conversion apparatus according to claim 1, wherein, in the second period, each cyclic period corresponding to a switching period of the rectifying circuit includes a time period during which no current flows through the inductor.

3. The electric power conversion apparatus according to claim 1, wherein the second period is configured to include a first sub-period and a second sub-period subsequent to the first sub-period, and the control circuit is configured to set a duty ratio of the one or more switching devices of the rectifying circuit to a first duty ratio in the first sub-period, and set the duty ratio of the one or more switching devices of the rectifying circuit to a second duty ratio greater than the first duty ratio in the second sub-period.

4. The electric power conversion apparatus according to claim 3, wherein the control circuit is configured to perform the comparison operation a plurality of number of times in the first sub-period, and detect the short circuit between the two coupling terminals, based on comparison results of the comparison operation performed the plurality of number of times.

5. The electric power conversion apparatus according to claim 4, wherein the first sub-period comprises a time period of a predetermined length, and the control circuit is configured to, when all the comparison results of the comparison operation performed the plurality of number of times in the first sub-period indicate that the voltage detected by the voltage sensor is lower than the threshold voltage, determine that the short circuit has occurred between the two coupling terminals.

6. The electric power conversion apparatus according to claim 4, wherein the first sub-period comprises a time period of a predetermined length, and the control circuit is configured to start the second sub-period when one or more of the comparison results of the comparison operation performed the plurality of number of times in the first sub-period indicate that the voltage detected by the voltage sensor is higher than the threshold voltage.

7. The electric power conversion apparatus according to claim 4, wherein the control circuit is configured to start the second sub-period when a latest one of the comparison results of the comparison operation performed the plurality of number of times in the first sub-period indicates that the voltage detected by the voltage sensor is higher than the threshold voltage.

8. The electric power conversion apparatus according to claim 3, wherein the control circuit is configured to perform the comparison operation one or more times in the second sub-period, and detect the short circuit of the first electric power terminal, based on comparison results of the comparison operation performed one or more times.

9. The electric power conversion apparatus according to claim 8, wherein the control circuit is configured to, when a latest one of the comparison results of the comparison operation performed one or more times in the second sub-period indicates that the voltage detected by the voltage sensor is lower than the threshold voltage, determine that the short circuit has occurred between the two coupling terminals.

10. The electric power conversion apparatus according to claim 8, wherein the control circuit is configured to perform the comparison operation a plurality of number of times in the second sub-period, and to, when comparison results of the comparison operation performed latest two or more predetermined number of times, out of the plurality of number of times, all indicate that the voltage detected by the voltage sensor is lower than the threshold voltage, determine that the short circuit has occurred between the two coupling terminals.

11. The electric power conversion apparatus according to claim 8, wherein the control circuit is configured to perform the comparison operation once in the second sub-period, and detect the short circuit between the two coupling terminals, based on a comparison result of the comparison operation.

12. The electric power conversion apparatus according to claim 3, wherein the voltage sensor is configured to stop operating in a part of the first sub-period, and operate in a part of the first sub-period and the second sub-period.

13. The electric power conversion apparatus according to claim 1, wherein the control circuit is configured to stop the operations of the switching circuit and the rectifying circuit when the short circuit of the first electric power terminal is detected.

14. An electric power conversion system comprising:

a first battery including a first terminal and a second terminal;

a second capacitor including a first terminal and a second terminal;

a first switch provided on a path coupling the first terminal of the first battery and the first terminal of the second capacitor to each other;

a second switch provided on a path coupling the second terminal of the first battery and the second terminal of the second capacitor to each other;

an electric power conversion apparatus; and a second battery, the electric power conversion apparatus including a first electric power terminal including a first coupling terminal and a second coupling terminal, the first coupling terminal being coupled to the first terminal of the second capacitor, the second coupling terminal being coupled to the second terminal of the second capacitor, a voltage sensor configured to detect a voltage between the first coupling terminal and the second coupling terminal, a switching circuit coupled to the first electric power terminal and including one or more switching devices, a transformer including a first winding and a second winding, the first winding being coupled to the switching circuit, a rectifying circuit coupled to the second winding and including one or more switching devices, a smoothing circuit coupled to the rectifying circuit and including an inductor and a first capacitor, a second electric power terminal coupled to the smoothing circuit and the second battery, and a control circuit configured to control operations of the switching circuit and the rectifying circuit, wherein the control circuit is configured to cause the rectifying circuit to operate to supply electric power from the second electric power terminal to the first electric power terminal in a second period that precedes a first period during which electric power is supplied from the first electric power terminal toward the second electric power terminal, and is configured to detect a short circuit between the first coupling terminal and the second coupling terminal by performing, in the second period, a comparison operation of comparing the voltage detected by the voltage sensor with a predetermined threshold voltage.

* * * * *